US012246352B2

(12) United States Patent
Wayman et al.

(10) Patent No.: US 12,246,352 B2
(45) Date of Patent: Mar. 11, 2025

(54) MECHANICAL SEPARATION DEVICE WITH SCREEN WASHING SYSTEM

(71) Applicant: ICM, Inc., Colwich, KS (US)

(72) Inventors: Alex Dexter Wayman, Goddard, KS (US); Marc Awtrey, Valley Center, KS (US); Brandon Awtrey, Eldorado, KS (US); Wayne Clutter, Goddard, KS (US)

(73) Assignee: ICM, Inc., Colwich, KS (US)

( * ) Notice: Subject to any disclaimer, the term of this patent is extended or adjusted under 35 U.S.C. 154(b) by 0 days.

(21) Appl. No.: 18/099,835

(22) Filed: Jan. 20, 2023

(65) Prior Publication Data

US 2023/0234101 A1 Jul. 27, 2023

Related U.S. Application Data

(60) Provisional application No. 63/302,998, filed on Jan. 25, 2022.

(51) Int. Cl.
*B07B 1/55* (2006.01)
*B07B 1/20* (2006.01)

(52) U.S. Cl.
CPC . *B07B 1/55* (2013.01); *B07B 1/20* (2013.01)

(58) Field of Classification Search
CPC .................................... B07B 1/20; B07B 1/55
USPC ................................................. 209/273, 380
See application file for complete search history.

(56) References Cited

U.S. PATENT DOCUMENTS 2,351,048 A * 6/1944 Imset ........................ D21D 5/02 209/357
5,423,977 A * 6/1995 Aoki .................... B01D 33/073 210/143
5,802,961 A * 9/1998 Hay ........................ A23L 3/185 366/136
6,536,602 B2 * 3/2003 Ruescher ........... B01D 29/6476 210/414

(Continued)

FOREIGN PATENT DOCUMENTS

WO WO-2014012883 A2 * 1/2014 ........... B01D 33/073

OTHER PUBLICATIONS

Canadian Application Serial No. 3,187,457, Examiners Rule 86(2) Report mailed Apr. 23, 2024, 5 pgs.

(Continued)

*Primary Examiner* — Michael McCullough
*Assistant Examiner* — Molly K Devine
(74) *Attorney, Agent, or Firm* — Schwegman Lundberg & Woessner, P.A.

(57) ABSTRACT

A mechanical separation device optionally includes one or more of a housing, a screen a rotary assembly, one or more wash bars and a plurality of nozzles. The screen can be positioned within the housing to separate at least a portion of the liquid medium from the solids. The rotary assembly can be within the housing and can be configured to move the solids and the liquid medium along an axial length of the housing toward the discharge outlet. The one or more wash bars can be within the housing and can be positioned adjacent the screen. The plurality of nozzles can be spaced along the one or more wash bars. The one or more wash bars can be configured to receive a wash fluid and the plurality of nozzles configured to discharge the wash fluid against the screen.

14 Claims, 10 Drawing Sheets

(56) References Cited

U.S. PATENT DOCUMENTS

| | | | | |
|---|---|---|---|---|
| 6,730,219 | B2 * | 5/2004 | Turchetti | B01D 29/96 210/411 |
| 11,103,811 | B2 * | 8/2021 | Gallop | B01D 29/78 |

OTHER PUBLICATIONS

Canadian Application Serial No. 3,187,457, Response filed Aug. 21, 24 to Examiners Rule 86(2) Report mailed Apr. 23, 2024, 13 pgs.

Brazil Application Serial No. BR102023001397-0, Office Action mailed Sep. 25, 2024, w/ English Translation, 7 pgs.

* cited by examiner

MECHANICAL SEPARATION DEVICE WITH SCREEN WASHING SYSTEM

CLAIM FOR PRIORITY

This application claims the benefit of U.S. Provisional Patent Application Ser. No. 63/302,998, filed on Jan. 25, 2022, the benefit of priority of which is claimed hereby, and which is incorporated by reference herein in its entirety.

TECHNICAL FIELD

The subject matter of this disclosure relates to a mechanical separation device that is used to separate components in a process stream. In particular, the subject matter is directed to design improvements for the mechanical separation device to automate screen cleaning within the equipment and thereby improve separation efficiency and reduce labor costs.

BACKGROUND

A wide range of industrial applications require materials to be separated into several components through, for example, some type of filtration process utilizing a liquid medium. Once filtered, the separated component, and/or the remainder of solid material and liquid medium, may be further processed so as to result in one or more desired products. By way of example, various methods of producing alcohol from grain may require fibrous component of the grain be separated from starch and/or other components of the grain.

There are two known corn processes to produce ethanol: corn wet milling and dry grind milling. Corn wet milling, for example, separates the fiber from the starch in corn and subsequently uses the starch to produce ethanol, which may be used for fuel for automobiles or other motor vehicles. Dry grind milling, for example, also separates the fiber or insoluble solids (also referred to as "wet cake") from the liquid in a process stream, such as "thin stillage" from the residuals, i.e., "whole stillage", produced from distillation. The fiber can be subsequently used to produce distillers grains for animal feed, such as feed for cattle, pigs, or chickens.

In corn milling processes, the corn feedstock is mixed with water to form a slurry having a relatively high percentage of water (e.g., 60% or higher). The process may separate the fiber from the slurry, which in addition to the water, contains, for example, starch and other components of the corn, and the slurry is further processed to produce ethanol. Conventional devices used for separation may include pressure screen devices, gravity screen devices, centrifuges, and other separation type devices. However, these conventional devices have drawbacks including in most cases one or more of a reduced separation efficiency, lower throughput or higher capital cost relative to more recently developed mechanical separation devices fabricated by the applicant.

However, most mechanical separation devices including those developed recently by the applicant may have one or more screens that must be cleaned at regular intervals as they can become fouled by use, thereby reducing separation efficiency. The cleaning process is manually performed and necessitates high labor costs. Additionally, the mechanical separation device must be taken off-line for cleaning and the housing opened at various locations to access the one or more screen, thereby increasing the machine downtime. Cleaning of the one or more screens should be done at regular intervals, however, as this is a manual process, regular cleaning has been found to be inconsistently performed. Cleaning personnel may be reluctant to halt device operation for cleaning in cold or other in climate weather, for example. Cleaning personnel may be reluctant as opening the housing to access the one or more screens requires manipulating tools, manipulating hoses, and can take several minutes.

Accordingly, there is a need for improved designs on mechanical separation devices to provide for automated screen cleaning to improve separation efficiencies, to improve throughput, to reduce capital costs, and to reduce shutdown time at plants.

SUMMARY

This disclosure is directed to an improved mechanical separation device for separating solids from liquids in a process stream. The improved mechanical separation device of the present disclosure increases separation efficiency by preventing screen fouling due to lack of cleaning. The improved mechanical separation device also reduces labor costs by eliminating the need for manual cleaning of the screens.

In an embodiment, a mechanical separation device optionally includes one or more of a housing, a screen a rotary assembly, one or more wash bars and a plurality of nozzles is disclosed. The housing can have a feed inlet at a first end section of the housing and a discharge outlet at a second end section of the housing. The feed inlet can be configured to receive a slurry comprising solids within a liquid medium. The screen can be positioned within the housing to separate at least a portion of the liquid medium from the solids. The rotary assembly can be within the housing and can be configured to move the solids and the liquid medium along an axial length of the housing toward the discharge outlet. The one or more wash bars can be within the housing and can be positioned adjacent the screen. The plurality of nozzles can be spaced along the one or more wash bars. The one or more wash bars can be configured to receive a wash fluid and the plurality of nozzles configured to discharge the wash fluid against the screen.

In some examples, an automated washing system that optionally includes any one or combination of one or more pumps, one or more wash fluid lines in fluid communication with the one or more pumps, one or more valves configured to regulate a flow of a wash fluid through the one or more wash fluid lines, a mechanical separation device and a controller is disclosed. The mechanical separation device can optionally include a housing, a screen, a rotary assembly, a plurality of wash bars, and a plurality of nozzles. The housing can have a feed inlet at a first end section of the housing and a discharge outlet at a second end section of the housing, the feed inlet configured to receive a slurry comprising solids within a liquid medium. The screen can be positioned within the housing to separate at least a portion of the liquid medium from the solids. The rotary assembly can be within the housing, the rotary assembly configured to move the solids and the liquid medium along an axial length of the housing toward the discharge outlet. The plurality of wash bars can be within the housing and positioned adjacent the screen. The plurality of nozzles can be spaced along each of the plurality of wash bars, wherein each of the plurality of nozzles is configured to discharge the wash fluid against the screen. The controller can be configured to control operation of at least the one or more pumps to pump the wash fluid through the one or more wash fluid lines to one or more of the plurality of wash bars and to the plurality of nozzles.

In some examples, a method of washing a screen within a housing of a mechanical separation device is disclosed. The method can include any one or any combination of controlling with an electronic controller pumping of a wash fluid to one or more wash bars within the housing and positioned adjacent the screen; and discharging the wash fluid against the screen from a plurality of nozzles spaced along the one or more wash bars.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other aspects and advantages of the claimed subject matter will be apparent from the following Detailed Description of the embodiments and the accompanying figures.

BRIEF DESCRIPTION OF THE DRAWINGS

The Detailed Description is set forth with reference to the accompanying figures. The use of the same reference numbers in different figures indicates similar or identical items. The features illustrated in the figures are not necessarily drawn to scale, and features of one embodiment may be employed with other embodiments as the skilled artisan would recognize, even if not explicitly stated herein. The accompanying drawings illustrate example embodiments of the subject matter and, with a detailed description of the embodiments given below, serve to explain the principles of the subject matter.

DETAILED DESCRIPTION

Figure 1:
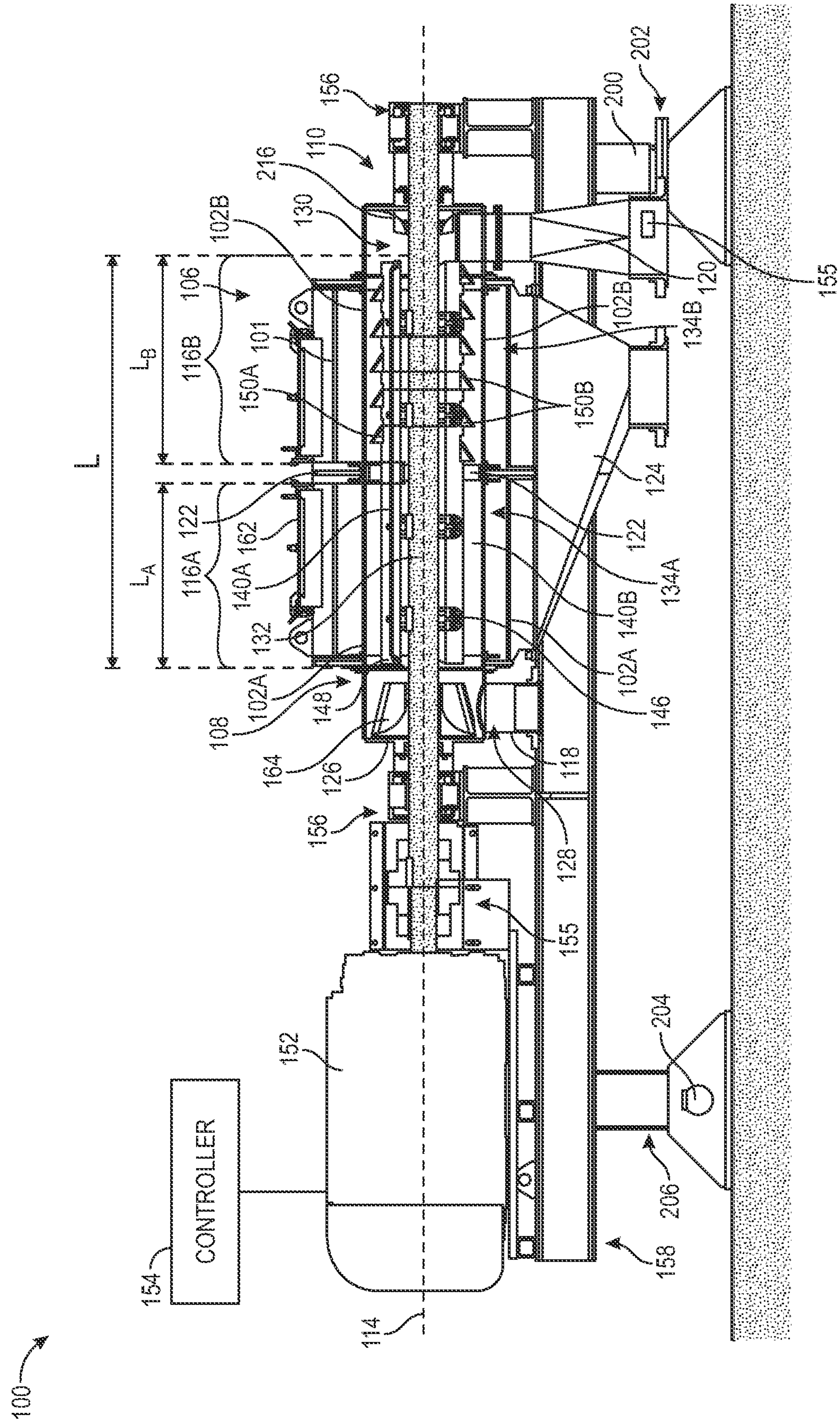
FIG. 1 is a cross-sectional side view of an example mechanical separation device.

The Detailed Description describes embodiments of the subject matter and the various features and advantageous details thereof are explained more fully with reference to non-limiting embodiments and examples that are illustrated in the accompanying figures and detailed in the following description. Descriptions of well-known components and processing techniques may be omitted so as to not unnecessarily obscure the embodiments of the subject matter. The examples used herein are intended merely to facilitate an understanding of ways in which the subject matter may be practiced and to further enable those of skill in the art to practice the embodiments of the subject matter. Accordingly, the examples, the embodiments, and the figures herein should not be construed as limiting the scope of the subject matter.

This disclosure describes examples of a mechanical separation device that can be used to separate components, such as solids from liquids, in a process stream obtained from a production facility. For instance, the production facility may include, but is not limited to, a facility that produces one or more of biofuel, alcohol (e.g., ethanol), animal feed, oil, biodiesel, pulp and paper, textiles, chemicals, and production facilities in other fields. In an example, the mechanical separation device separates solids from a process stream in an ethanol production facility upstream of fermentation, e.g., so that the solids can bypass fermentation. In another example, the mechanical separation device separates the solids from a process stream in an ethanol production facility downstream of fermentation, e.g., to provide for one or both of a drier solid product or a more pure liquid stream for further processing. The improved design aspects of the example mechanical separation device improve separation efficiencies, which will reduce operating costs as well as reduce energy usage for downstream processing in the production facility. Furthermore, the improved design can have labor cost savings and/or can reduce machine downtime.

The majority of the fuel ethanol in the United States is produced from the corn wet milling process or the dry grind milling process. Any type and quality of grain can be used to produce ethanol, such that the feedstock for these processes can include, but is not limited to, corn known as "No. 2 Yellow Dent Corn." The "No. 2" refers to a quality of corn having certain characteristics as defined by the National Grain Inspection Association, as is known to those of skill in the art. "Yellow Dent" refers to a specific type of corn, which is also known to those of skill in the art. Sorghum grain is also utilized to a very small extent. For corn milling, the current industry average for ethanol yield for both dry grind milling and corn wet milling plants is approximately 10.2 liters (approximately 2.7 gallons) of ethanol produced per 25.4 kg (one (1) bushel) of No. 2 Yellow Dent Corn. Specific embodiments of the design improvements are used for illustration purposes in the wet milling process and the dry grind milling process, and should not be considered limiting for corn wet milling or thy grind milling or for any other field in which the improved mechanical separation device may be used. The design improvements may be implemented in production facilities in fields other than ethanol production, as discussed above.

Turning to FIG. 1, a cross-sectional side view of an example mechanical separation device 100 (also referred to simply as "the device", "the apparatus" or "the machine") is shown. The example mechanical separation device 100 comprises a self-contained device configured for separating a solids material from at least a portion of a liquid medium. In an example, the solids material that is separated by the mechanical separation device 100 includes fiber from a corn wet milling or dry grind milling ethanol production process, and the liquid medium separated from the fiber solids can include a pre-fermentation starch solution or a post-fermentation beer or stillage. In examples where the mechanical separation device 100 is used in a corn wet milling process, the mechanical separation device 100 can perform one or more of the initial filtering of the slurry, pre-washing of the fiber to clean the fiber and to remove starch/gluten that is associated with the fiber, or washing/dewatering of the fiber. For a dry grind milling process, the mechanical separation device 100 can perform one or more of: an initial filtering of the slurry; pre-washing of the fiber to clean the fiber, gluten, or fat; to remove starch that associated with the fiber; or washing/dewatering of the fiber, gluten, or fat.

Figure 4:
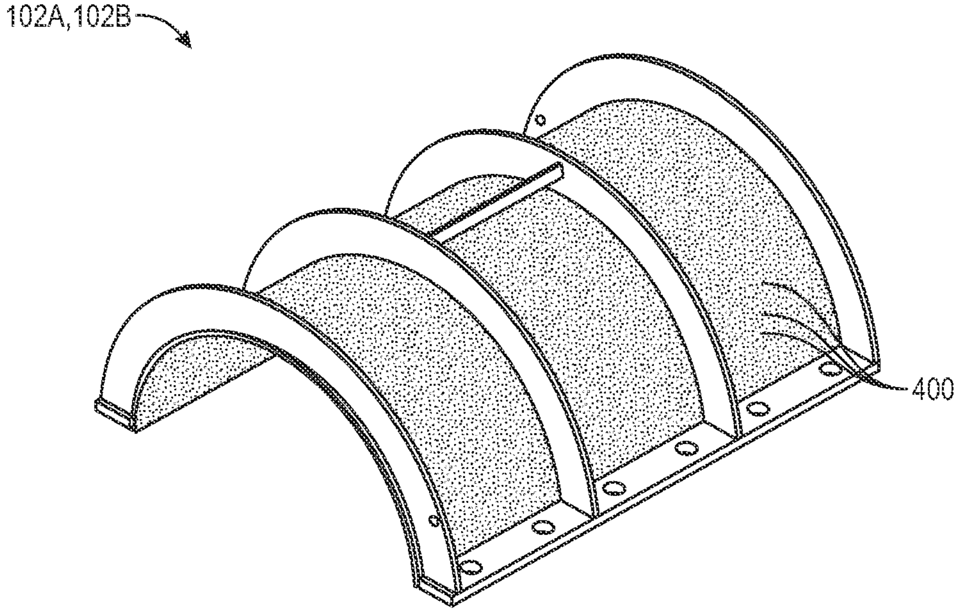
FIG. 4 is an isometric view of an example screen that can be used, for example, in the mechanical separation device of FIGS. 1-2B.

The mechanical separation device 100 includes one or more stationary, hollow cylindrical-shaped screens 102A, 102B. FIG. 4 shows a non-limiting example embodiment of a screen that can be used in the mechanical separation device 100. Each screen 102A, 102B, etc. can include a plurality of openings formed therein, for example as a plurality of openings that are formed through a sheet of material that makes up the screen 102A, 102B, etc. The plurality of openings permit the liquid medium, including any wash water and any starch and/or gluten and/or fine suspended particles (including yeast from fermentation) washed off the fiber, to pass through the screen 102A, 102B, etc. while preventing larger-sized solids material, such as fiber, from passing through. Further details of the example screen shown in FIG. 4 are described below.

In FIG. 1, the one or more screens 102A, 102B, etc. are disposed in an interior of an elongated housing 106, which includes a first end 108, also referred to as a feed end 108, and a second end 110, also referred to as a discharge end 110. The one or more screens 102A, 102B, etc. can situated about a central axis 114 of the mechanical separation device 100 and extend substantially along the axial length (L) of the housing 106.

Although a single or a unitary elongated screen may be utilized, the mechanical separation device 100 in FIG. 1 is shown with individual first and second screen sections 102A and 102B, which are situated adjacent one another along the axial length (L) of the housing 106 to generally correspond respectively with first and second zones 116A and 116B of the housing 106. The first screen section 102A is located proximate to a feed inlet 118 located at or proximate to the feed end 108 of the housing 106 adjacent the first zone 116A to receive the incoming process stream to be separated, e.g., a slurry that includes solids and a liquid medium. In an example, the first screen section 102A extends partly along the axial length (L) of the housing 106 to about a midway point thereof. Additionally, this screen 102A also extends radially around at all or at least a portion of the central axis 114. The second screen section 102B is situated axially adjacent to the first screen section 102A at about the midway point and extends partly along the remainder of the axial length (L) of the housing 106 to proximate a solids discharge chute 120, which is situated at or proximate to the discharge end 110 of the housing 106 adjacent the second zone 116B. Additionally, this screen 102B also extends radially around at all or at least a portion of the central axis 114.

The lengths $L_A$ and $L_B$ of the first and second screen sections 102A and 102B, respectively, may vary but, due to the overall length, a large volume of liquid medium and solids material can be processed while still producing a desirably dry material. For example, the first or second screen section 102A, 102B may extend less than or more than about the midway point of the mechanical separation device 100. Also, while only two screen sections 102A, 102B are shown in the example mechanical separation device 100 of FIG. 1, those of skill in the art will appreciate that only a single screen can be used, or that more than two screen sections may be utilized. In addition, while the diameter of the screens 102 is shown as being substantially constant along its length, the screen diameter may vary along at least one or more portions thereof. In one example, the mechanical separation device 100 may have a screen length to screen diameter (L/D) ratio greater than 3. In another example, the L/D screen ratio is between approximately 3 and 10, and more preferably between 4 and 6. These values are exemplary and those of ordinary skill in the art will recognize other ratios suitable for a particular application.

FIG. 1 additionally shows a spray bar 101 (sometimes called a "wash bar" herein). The spray bar 101 can be positioned within the housing 106 adjacent to an extending axially along the screens 102A, 102B. The details of the spray bar 101 will be discussed an illustrated subsequently. The spray bar 101 can discharge a wash fluid against an exterior surface and/or interior surface of the screens 102A, 102B. The term "wash fluid" can include water (specific purpose water, repurposed plant water (e.g., flush water, waste caustic, etc.), cleaning solution or the like. The discharge of the wash fluid can clear or partially clear one or more of the plurality of openings in the screen 102A, 102B and can remove solids and other particulate and material that are on the surface (interior and/or exterior) of the screen 102A, 102B. Regularly scheduled washing of the screen 102A, 102B with an appropriate duration of length can increase the separation efficiency of the mechanical separation device improving process efficiency and providing other benefits discussed previously.

The housing 106 generally surrounds the spray bar 101 and screens 102A, 102B and collects the liquid medium that passes through the plurality of openings in the screens 102A, 102B. In an example, the housing 106 includes at least one interior partition 122 that compartmentalizes and separates the housing 106 into the first and second zones 116A, 116B. The first and second zones 116A, 116B can include a hopper 124 with a corresponding outlet for the removal of filtered liquid medium from the housing 106 and to direct the filtered liquid medium to a desired location. In the example of FIG. 1, the first and second zones 116A, 116B are positioned sequentially and axially adjacent to one another.

In an example, the first zone 116A generally defines an initial separation zone, while the second zone 116B generally defines another separation zone. In the example of FIG. 1, the solids discharge chute 120 is located at or proximate to the end of the second zone 116B, The solids discharge chute 120 allows the separated and de-watered solids material, such as separated and dewatered fiber, to be collected for further processing. Although two zones 116A, 116B are illustrated here, those of ordinary skill in the art will appreciate that the number of separation zones 116A and the number of dewatering zones 116B may be application specific, i.e., may vary in number as well as in length. Only a single separation zone is contemplated in some embodiments. The first or second zone 116A, 116B may extend less than or more than about the midway point of the mechanical separation device 100. The housing 106 may have any suitable shape. If more than two zones are desired, e.g., three zones, the housing 106 may simply be adapted to include an additional interior partition 122 to further compartmentalize the housing into a first zone 116A, a second zone 116B, and a third zone (not shown in FIG. 1), which can include the hopper 124 with a corresponding outlet for removing filtered liquid medium from the zones 116A, 116B and directing the filtered liquid medium to a desired location. In one example, the interior partition 122 is movable or adjustable, e.g., slidably adjustable, generally along the axial length (L) of the apparatus to vary or control the size of the zones 116A, 1168.

The feed inlet 118 is located at or proximate to the feed end 108 of the housing 106. In an example, the feed inlet 118 is adjacent to the first zone 116A and in fluid communication with an interior space of the first screen section 102A that corresponds with the first zone 116A of the housing 106. For example, the housing 106 or some other structure within the mechanical separation device 100 can direct a feed flow of a process stream, e.g., a process stream that includes a liquid medium and a solids material, into the interior space of the first screen section. 102A proximate to the central axis 114. In an example, the feed inlet 118 is configured to feed the liquid medium and the solids, e.g., fiber, in a feed direction that is angled relative to the central axis 114 and the feed inlet 118 is also configured to change the direction of the liquid medium and the solids material to be separated from the angled feed direction to an axial direction that is general parallel to the central axis 114.

In some examples, the feed inlet 118 is configured so that the feed direction of the liquid medium and solids is perpendicular or substantially perpendicular to the central axis 114. In some examples when the feed inlet 118 provides for a feed direction that is perpendicular or substantially perpendicular to the central axis 114, the feed inlet 118 introduces the liquid medium and solids with a tangential or substantially tangential entry into the interior of the housing 106 so that the liquid medium and solids material enter the interior in a swirling fashion so that filtering of the solids material can be begin upon entry into the mechanical separation device 100.

In an example, the feed inlet 118 is formed as part of a feed housing 126 that includes an inlet opening 128 through which the liquid medium and solids material, e.g., fiber, is fed into the interior of the housing 106. The inlet opening 128 can include hardware for connecting to piping or other conveyance structures through which the liquid medium and solids material can flow, for example when being fed to the mechanical separation device 100 from another processing apparatus from another part of the process. In the example shown in FIG. 1, the inlet opening 128 is located on a bottom side of the feed housing 126 so that the liquid medium and solids material is fed generally upward into the feed housing 126. In an example, a connection between the feed housing 126 and the main housing 106 of the mechanical separation device 100 is adjustable so that the orientation of the feed housing 126 relative to the main apparatus housing 106 can be changed to position the inlet opening 128 in locations other than on the bottom of the mechanical separation device 100. For example, the feed housing 126 can be rotated about the central axis 114 relative to the main housing 106 so that the inlet opening 128 is on a top side of the mechanical separation device 100 rather than on the bottom so that the liquid medium and solids material can be fed downward into the mechanical separation device 100. In other examples, the connection between the feed housing 126 and the main housing 106 can be configured to allow the inlet opening 128 to be positioned on a side of the feed housing 126 so that the liquid medium and solids material can be fed laterally into the mechanical separation device 100. Examples that include a feed housing 126 that is positionable relative to the main housing 106 can give a system designer more flexibility to install the mechanical separation device 100 because the feed housing 126 can be rotated relative to the main housing 106 and position the inlet opening 128 at a convenient position for existing or planned feed piping.

In addition to the one or more screens 102A, 102B, the mechanical separation device 100 also includes a rotatable conveyor 130 (also referred to simply as "the conveyor 130") that is disposed or situated within the interior space of the screen 102A, 102B. In an example, the conveyor 130 is positioned lengthwise within the interior space of the one or more screens 102 and is configured to move the material being processed (e.g., the liquid medium and the solids) generally axially along the axial length (L) of the housing 106 from the feed inlet 118 towards the discharge chute 120. The conveyor 130 includes structures (described in more detail below) that are configured so that when the conveyor 130 rotates relative to the stationary screen 102A, 102B, the conveyor 130 directs the liquid medium and solids radially outward toward the one or more screens 102A, 102B to filter the solids from the liquid medium. The conveyor 130 also includes structures (described in more detail below) that can push the solids material axially along the length of the housing 106 within the interior space of the screens 102A, 102B. In an example, the conveyor 130 rotates around the central axis 114.

The conveyor 130 includes a rotatable shaft 132 that extends along the axial length (L) of the mechanical separation device 100 and is situated about the central axis 114. In an example, the shaft 132 defines a first conveyor section 134A that generally corresponds with the first zone 116A of the first screen section 102A and a second conveyor section 134B that generally corresponds with the second zone 116B of the second screen section 102B.

In an example, the conveyor 130 includes a plurality of paddles 140A, 140B, etc. that are coupled to the rotatable shaft 132 so that the paddles extend radially outward from an outer surface of the shaft 132. Each paddle 140A, 140B, etc. includes a proximal edge that is coupled to the shaft 132 and a distal edge that generally opposes and is radially spaced from the proximal edge. In an example, the paddles 140A, 140B, etc. are configured and positioned so that the distal edges are in close proximity to an inner surface of the screen 102A, 102B so that the rotational force exerted on the liquid medium and solids material by the paddles 140A, 140B is maximized. In an example, each paddle 140A, 140B, etc. is coupled to the shaft 132 with one or more spaced apart support arms 146 that are coupled to the shaft 132, The support arms 146 can be coupled to their corresponding paddle 140A, 140B, etc. with any reasonable fastening structure, including, but not limited to, nuts and bolts.

In an example, one or more of the paddles 140A, 140B, etc. includes a wedge bar 148 located at or proximate to the proximal edge. The wedge bar 148 extends laterally outward from both sides of the paddle 140A, 140B, etc. and extends axially along a substantial length of the paddle 140A, 140B, etc., for example along the entire length or substantially the entire length of the paddle (although the wedge bar 148 can include gaps that accommodate the support arms 146.

The wedge bar 148 has a profile or cross-sectional shape at leading edge (e.g. the side of the paddle 140A, 140B, etc. that encounters material when the conveyor 130 is rotating, which depends on which direction the conveyor 130 is rotating), The profile is such that it prevents or minimizes buildup of material, and in particular solids material, at the proximal edge of the paddle 140A, 140B, etc. For example, the wedge bar 148 includes a tapered or sloped face on the leading side of the paddle 140A, 140B, etc. (which will depend on the direction of rotation). In an example, the wedge bar 148 includes a tapered face on both sides of the wedge bar 148 so that the material buildup on the proximal edge of the paddle 140 will be minimized regardless of which direction the conveyor 130 is rotated. Further details regarding the construction of the wedge bar 148 and other features of the mechanical separation device can be found in U.S. Patent Application Publication No. 2019/0374883, entitled "Mechanical Separation Device", filed Jun. 7, 2019, U.S. Pat. No. 9,376,504, entitled "HYBRID SEPARATION," issued on Jun. 28, 2016, U.S. Pat. No. 9,718,006, entitled "MULTI-ZONE SCREENING APPARATUS," issued on Aug. 1, 2017, and U.S. application Ser. No. 15/796,446, filed on Oct. 27, 2017, entitled "DESIGN IMPROVEMENTS FOR MECHANICAL SEPARATION DEVICES," U.S. patent application Ser. No. 14/073,046, entitled "Advanced Cook Technology," filed on Nov. 6, 2013, and U.S. patent application Ser. No. 14/557,175, entitled "Optimized Dewatering Process for an Agricultural Production Facility," filed on Dec. 1, 2014; the entire disclosures of which are hereby incorporated herein by reference as if reproduced in their entireties.

The profile or cross-sectional shape of the wedge bar 148 is triangular or substantially triangular in shape, for example with the shape of an isosceles triangle with a base spaced radially from the proximal edge and extending laterally outward normal or substantially normal to the plane of the paddle 140A, 140B. The profile of the wedge bar 148 can be symmetrical or substantially symmetrical about the plane of the paddle 140A, 140B, etc. and forms a triangular wedge that is narrowest at the apex at or proximate to the proximal edge and widens as the wedge bar 148 extends radially towards its base.

The plurality of paddles 140A, 140B, etc. can be uniformly or substantially uniformly spaced about the axis 114 about the shaft 132 (e.g., adjacent paddles 140A, 140B can be oriented at an angle relative to one another). In an example, the number of paddles 140A, 140B, etc. can range from two (2) to ten (10).

In an example, a portion of one or more of the paddles 140A, 140B, etc. can also include a plurality of flingers 150A, 150B, etc. that are coupled to the distal edge along a portion of the length of the paddle 140A, 140B, etc. Further details regarding the flingers 150A, 150B, etc. In the example shown in FIG. 1, the paddles 140A, 140B, etc. axially extend generally along the entire axial length L of the housing 106, but only include the flingers 150A, 150B, etc. along the portion of the length $L_B$ corresponding to the second conveyor section 134B that is in the second zone 116B of the mechanical separation device 100. In other words, the paddles 140A, 140B do not include flingers 150A, 150B along the portion of the length $L_A$ corresponding to the first conveyor section 134A that is in the first zone 116A, but rather only include flingers along the portion of the length $L_B$ corresponding to the second conveyor section 134B in the second zone 116B. Although the mechanical separation device 100 is shown with each paddle 140A, 140B extending along the entire length L of the housing 106 (e.g., along the combined length $L_A$ of the first zone 116A and the length $L_B$ of the second zone 116B), those of skill in the art will appreciate that the mechanical separation device 100 can include separate axially positioned paddles 140A, 140B, etc. for the first zone 116A and for the second zone 116B without varying from the scope of the present disclosure.

As the shaft 132 rotates, the relatively large surface area of the paddles 140A, 140B, etc. will force the liquid medium and solids radially outward toward an inner surface of the screen 102A, 102B, etc. due to centrifugal force acting on the liquid medium and solids. In an example, the angled or tapered shape of the wedge bar 148 (described above) also acts to force the liquid medium and the solids radially outward toward the inner surface of the screen 102A, 120B, etc. When the material encounters the screen 102A, 102B, at least a portion of the liquid medium is forced through the openings in the screen 102A, 102B to an exterior of the screen because of the centrifugal force, while the solids is retained within the interior space of the screen 102A, 102B, etc. because the solids generally comprises particles that are larger than the size of the openings. In an example, the first conveyor section 134A primarily only drives the liquid medium and the solids portion radially outward due to the rotation of the shaft 132 and the paddles 140A, 140B, etc., while axial movement of the liquid medium and the solids occurs mainly due to fluid flow of the liquid portion to fill space vacated by the other material that has been conveyed axially forward by the second conveyor section 134B (described in more detail below). In other examples, the first conveyor section 134A of the conveyor 130 can include structures (not shown) that are configured to drive the liquid medium and the solids portion axially along the interior space within the screen 102A, such as one or more flights, which can be arranged in a helical configuration that will act to push material through the apparatus similar to screws or auger-like structures.

In an example, the second conveyor section 134B of the conveyor 130 is axially adjacent to the first conveyor section 134A. As noted above, the second conveyor section 134B generally corresponds with the second zone 116B of the mechanical separation device 100. As with the first conveyor section 134A, the second conveyor section 134B can include the plurality of paddles 140A, 140B, etc. that extend axially along the length $L_B$ of the second screen section 102B.

The gap between the screen 102B and the distal edges or the flingers 150A, 150B, etc. of the paddles 140A, 140B, etc. can be adjusted down to as low as about 0.625 inches (about 1.59 centimeters cm)). A smaller gap results in dewatered solids having a lower moisture content (e.g., a drier cake), provides for a higher capacity for the mechanical separation device 100, and can also result in purer fiber when the apparatus is used in a wet corn milling or dry grind milling process. A larger gap results in dewatered solids having a higher moisture content (e.g., a wetter cake) and a lower capacity for the mechanical separation device 100, but can also result in a purer protein stream in the liquid medium that passes through the screen openings 104 when the apparatus is used in a wet corn milling or dry grind milling process.

The specific design and configuration of the flingers 150A, 150B, etc. can help facilitate the axial movement of the solids material along the length $L_B$ of the second conveyor section 134B to meet the requirements of a particular application.

With further reference to FIG. 1, a motor 152 is operatively coupled to the shaft 132 for rotation of the conveyor 130 about the central axis 114. A controller 154, can be operatively coupled to the motor 152 for controlling the rotational speed of the conveyor 130, which may be constant or variable. The controller 154 has further functions, which will be discussed in reference to further of the FIGURES. According to one example, the controller 154 can communicate with one or more sensors 155. These one or more sensors 155 can be configured to determine a moisture content of the solids exiting the solids discharge chute 120, for example. The one or more sensors 155 location is purely exemplary however and can be at another location. The controller 154 can control operation based upon the sensed moisture content of the solids including in actuating cleaning of the screens 102A, 102B using the spray bar 101 as further discussed herein.

Rotation of the shaft 132 may be achieved by a suitable motor 152 or other motive force-generating device, as understood in the art. For example, one end of the shaft 132 may be operatively coupled to an electric motor so as to cause the shaft 132 to rotate about the central axis 114. In an example, the controller 154 is a electronic computer that can control the rotational speed of the shaft 132. Such a controller 154 is generally known to those of ordinary skill in the art. The rotational speed of the shaft 132 may be selectively varied depending on the specific application. In an example, the shaft 132 is rotated at a rotational speed (e.g., measured in revolutions per minute or "RPM") ranging from about 100 RPM to about 2000 RPM (e.g., from about 1.67 hertz (Hz) to about 33.33 Hz). In another example, the rotational speed ranges from about 400 RPM to about 1000 RPM (e.g., from about 6.67 Hz to about 16.67 Hz). In another example, the rotational speed ranges from about 500 RPM to about 900 RPM (e.g., from about 8.33 Hz to about 15 Hz). A higher rotational speed provides higher capacity for the mechanical separation device 100, but consumes more power. Other factors can also affect the capacity of the mechanical separation device 100, including, but not limited to: the extent of elevation of the discharge end 110 (described in more detail below); the size of the openings 104 in the one or more screens 102; and the configuration of the paddles 140. Those of skill in the art will appreciate that considering the relationship between each of these factors (as well as other factors that can affect capacity of the device 100) will be helpful when increasing capacity. As will be appreciated by those of ordinary skill in the art, these values for the rotational speed are exemplary and that the actual rotational speed used may be selected and optimized to meet the specifications of a particular application.

In an example, the operative coupling of the motor 152 to the shaft 132 is a direct coupling, e.g., wherein the motor 152 acts directly on the shaft 132 (with or without a gear mechanism) such that the axis of rotation of the motor 152 is coaxial or substantially coaxial with the central axis 114 of the shaft 132. The motor 152 can comprise the General Electric (GE) electrical motor having model number 5KS447SAA408D5 (125 horsepower (HP), 460 volt (V), 60 Hz, 900 RPM) and the coupling 155 comprises a Herculflex FX 3 coupling (maximum bore 4.25 inches) sold by Lovejoy, Inc., Downers Grove, IL.

In an example, the shaft 132 can be supported by one or more bearing mechanisms 156, which in turn can be supported by a support structure such as a support frame 158. In an example, each bearing mechanism 156 comprises an oil bath bearing, which can have a longer life with less maintenance required compared to other bearing mechanisms. In an example, each bearing mechanism 156 comprises a Ductile iron Pillow Block Housing Model Number SAF522-D with Bearing 22222-E1-K, sold under the FAG brand by Schaeffler Group US Inc., Fort Mill, South Carolina, USA.

With further reference to FIG. 1, the mechanical separation device 100 can include one or more removable access panels 162, for example which can be situated on a top side of the housing 106. The access panels 162 can provide for access to the interior of the housing 106. With prior mechanical separation device 100 design, the panels 162 would need to be opened by personnel to access the screen 102A, 102B for manual washing. This process including gathering wash lines, shutting the device 100 down, etc. and was not favored by personnel in cold weather, for example. Consequently, some personnel would not perform regular cleaning of the screens 102A, 102B per operational guidelines. This resulted in fouled screens with reduced separation efficiency.

The mechanical separation device 100 may have a length to diameter (L/D) ratio greater than two. In one embodiment, the mechanical separation device 100 may have a L/D ratio between approximately 2:1 and 10:1, and more preferably between 4:1 and 6:1. These values are exemplary and those of ordinary skill in the art will recognize other ratios suitable for a particular application.

Figure 8:
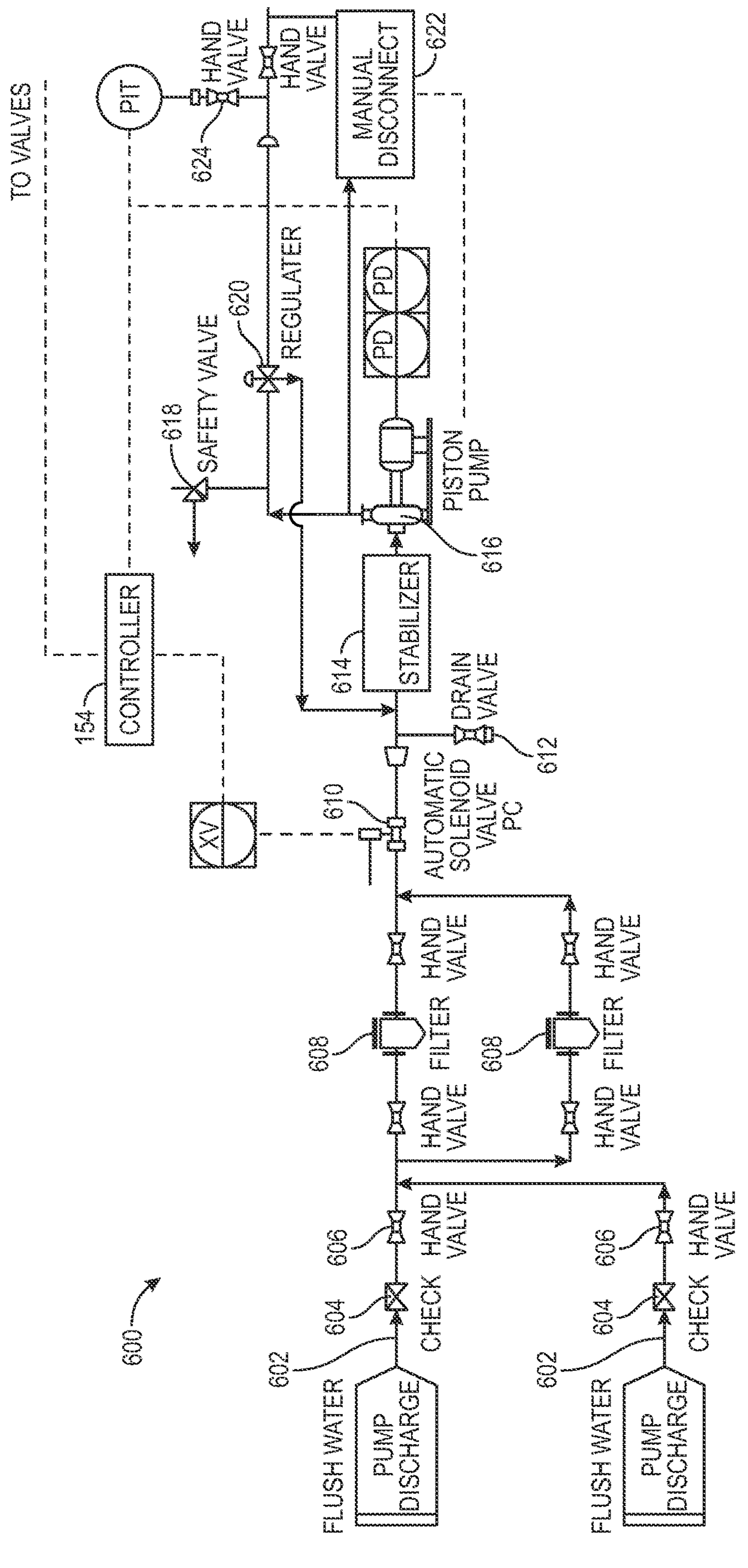
FIG. 8 is a schematic diagram of an example wash system for a mechanical separation device according to one embodiment.
Figure 8:
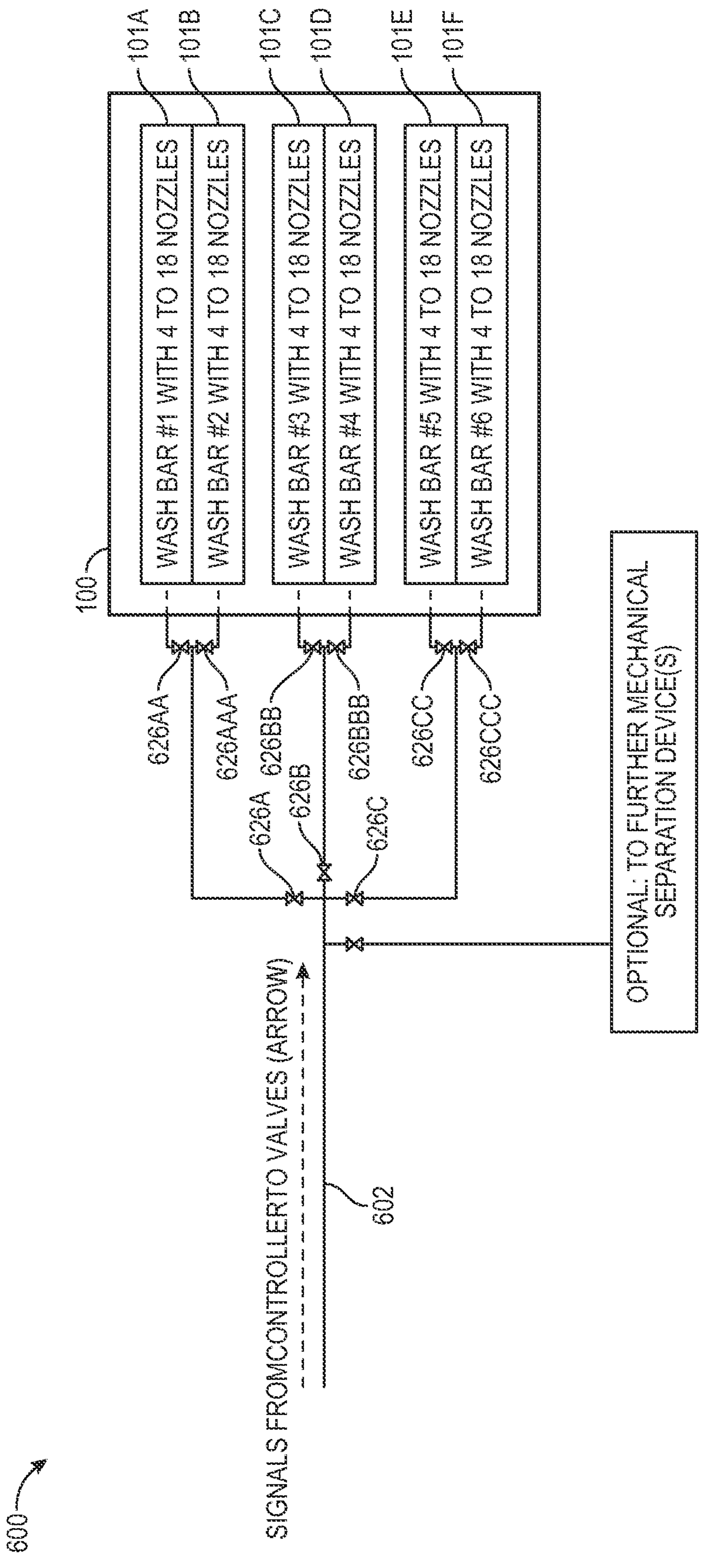

In an example, the mechanical separation device 100 includes a shaft inlet cover 164 that is placed over the shaft 132 at or proximate to the feed inlet 118, for example within the feed housing 126 as shown in FIG. 1 and the enlarged view of FIG. 8. The shaft inlet cover 164 can be coupled to the shaft 132 so that the shaft inlet cover 164 rotates as the shaft 132 is rotated by the motor 152. The shaft inlet cover 164 serves two functions. First, the shaft inlet cover 164 covers the shaft 132 at or proximate to the exact location where the slurry material is fed into the mechanical separation device 100 and where the material first comes into contact with the conveyor 130 and provides the shaft 132 with extra protection against the abrasive wear described above. Second, the shaft inlet cover 164 includes one or more tapered guiding surfaces (as in the enlarged view of FIG. 8), which assist in changing the direction of the slurry material from the radial feed direction that it is travelling when it enters the mechanical separation device 100 through the inlet opening 128 (e.g., perpendicular or substantially perpendicular to the central axis 114 of the shaft 132) to a conveying direction along the housing 106 that is axial or substantially axial (e.g., parallel or substantially parallel to the central axis 114). As can be seen in the example of FIG. 8, the tapered guiding surfaces can comprise a sloping surface that changes direction from a portion that is perpendicular or nearly perpendicular to the central axis 114 (e.g., within about 2° to about 5° of perpendicular) at a first axial end of the shaft inlet cover 164 to a portion that is parallel or nearly parallel to the central axis 114 (e.g., within about 2° to about 5° of parallel) at a second axial end of the shaft inlet cover 164.

In an example, the shaft inlet cover 164 also comprises a segmented shroud that at least partially covers the one or more tapered guiding surfaces. In an example, the segmented shroud comprises one or more shroud flanges that are uniformly or substantially uniformly spaced about the axis 114 around the radially outermost edge of the one or more tapered guiding surfaces. The shroud flanges extend out from the crests of the tapered guiding surfaces (e.g., the ends of the tapered guiding surfaces that are radially the farthest spaced from the shaft 132) to partially obscure the tapered guiding surfaces. As the shaft 132 and the shaft inlet cover 164 are rotated by the motor 152, the shroud flanges of the segmented shroud act to break up the incoming slurry material such that the force that is exerted on the shaft 132 by the slurry material is not constant and continuous. This acts to further protect the shaft 132 and the shaft inlet cover 164 from abrasion and wear by the slurry material, and particular from abrasion and wear by the solids material in the slurry.

The mechanical separation device 100 can include features or structures in addition to those described above, including, but not limited to, an optional liquid inlet into the mechanical separation device 100 in order to feed water into one or both zones 116A, one or more outlets for withdrawing liquid (liquid medium) from the housing 106; or one or more baffles between the first and second zones 116A and 116B to control compaction in the first zone 116A and the amount of liquid medium that can be moved from one zone to the next (such as from the first to the second zone 116A, 116B).

To facilitate understanding of various aspects of the invention, operation of the mechanical separation device 100 will now be described in the context of fiber filtration in a corn milling process, e.g., in a wet milling or dry grind milling processes. It should be appreciated, however, that the mechanical separation device 100 may be used in a wide range of applications, including wet or dry milling processes for grains other than corn, and is not limited in use to either the corn wet mill or dry mill process described herein.

The rotation of the shaft 132 and, thus, the paddles 140A, 140B, etc. directs the slurry radially outward toward the first screen section 102A, which corresponds with the first zone 116A, to filter the solids material from the liquid medium. The rotation of the shaft 132 can also act to move the solids material and remaining liquid medium along the length $L_A$ of the screen 102A. The solids material, e.g., fiber, is filtered from at least a portion of the liquid medium by allowing water, starch, gluten, fat or oil, and relatively small solid particles that are in the slurry to pass through the openings 104 in the screen 102A and drain into the hopper 124, while solids particles from the slurry that are larger than the openings as well as a portion of the liquid medium are retained within the interior space in the screens 102A, 102B.

The solids material, e.g., the fiber, is eventually conveyed from adjacent the first screen 102A and into the interior space of the screen 102B in the second zone 116B. Rotation of the paddles 140A, 140B, etc. in the second zone 116B directs the solids material radially outward toward the screen 102B and is moved along the length of the screen 102B so that the solids material is further dewatered and filtered from the liquid medium. Also, in some examples, the flingers 150A, 150B, etc. coupled to the paddles 140A, 140B, etc. act to further compress the solids material against the inner surface of the screen 102B and forces additional liquid medium through the openings in the second screen section 102B (described in more detail below). The water, starch, gluten, fat or oil, and relatively smaller particles of the slurry that are forced through the openings in the screen 102B drain into the hopper 124. The flingers 150A, 150B, etc. also act to axially convey the solids (e.g., fiber) along the length $L_B$ of the second zone 116B towards the discharge chute 120. In some examples, at the end of second zone 116B, the solids material is concentrated so that its moisture content is from about 40% to about 80% liquid (e.g., water).

After exiting the mechanical separation device 100 via the discharge chute 120, the solids material can be further processed to result in a desired product. Moreover, the liquid medium that passes through the screens 102A, 102B and is collected in the hopper 124 can also be further processed, for example by combining the separated liquid medium (which can include starch) with the process stream that is fed into one or more of a liquefaction process, a saccharification process, or a fermentation process.

In an example, the mechanical separation device 100 can have a raising mechanism 200 can raise the discharge end 110 by up to about 10° from horizontal, such as up to about 9° from horizontal, for example up to about 8° from horizontal, such as up to about from horizontal, for example up to about 6° from horizontal, such as up to about 5° from horizontal.

In an example, the raising mechanism 200 is operatively coupled to a support frame 158 at a position that allows the raising mechanism 200 to raise a portion of the support frame 158 at or proximate to the discharge end 110 in order to raise the discharge end 110 of the mechanical separation device 100. As shown in the example of FIG. 1, the raising mechanism 200 is operatively connected to one or more legs 202 of the support frame 158 that are on the discharge side of the mechanical separation device 100 (also referred to as the discharge legs 202).

The support frame 158 can also include a pivot mechanism such as a pivot pin 204 that allows a portion of the support frame 158 to pivot relative to the ground when the raising mechanism 200 is raising or lowering the support frame 158 in order to raise or lower the discharge end 110. In an example, the pivot pin 204 is located on one or more legs 206 of the support frame 158 that are on the feed side of the mechanical separation device 100 (also referred to as feed legs 206), generally opposite from the discharge legs 202 to which the raising mechanism 200 is operatively coupled.

As discussed previously, the mechanical separation device 100 can include a moisture sensor or other moisture detection apparatus (the one or more sensors 155) at the discharge chute 120 or downstream of the mechanical separation device 100 that tests the moisture content of the dewatered solids cake that exits the mechanical separation device 100 via the discharge chute 120. The moisture sensor can be monitored by a controller (which could be the same controller 154 that controls the motor 152, or it can be a separate controller). The controller, in turn, uses the moisture content of the cake that is determined by the moisture sensor to determine wash interval, wash amount, wash duration, for the screens 102A, 102B as further discussed herein. In short, the moisture sensor can be used as the input for a control loop where the controlled variable is the washing of the screens 102A, 102B.

In an example, the mechanical separation device 100 includes a shaft outlet cover 216 that serves a similar purpose to the shaft inlet cover 164 described above. The shaft outlet cover 216 is placed over the shaft 132 at or proximate to the discharge chute 120, as shown in FIG. 1. The shaft discharge cover 216 can be coupled to the shaft 132 so that the shaft discharge cover 216 rotates as the shaft 132 is rotated by the motor 152. Similar to the shaft inlet cover 164, the shaft discharge cover 216 can have one or more tapered guiding surfaces, which assist in changing the direction of the dewatered solids material coming out of the interior space of the second zone 116B from an axial direction (e.g., the direction in which the dewatered solids material is conveyed by the second conveying section 134B through the second zone 116B) to a radial discharge direction (e.g., perpendicular or substantially perpendicular to the central axis 114 of the shaft 132) in order to send the dewatered solids material to the discharge chute 120.

While the subject matter has been illustrated by a description of various preferred embodiments and while these embodiments have been described in some detail, it is not the intention of the Applicant to restrict or in any way limit the scope of the appended claims to such detail. Additional advantages and modifications will readily appear to those skilled in the art.

In addition to the above, the mechanical separation device 100 as described above may be found beneficial in other industrial applications. By way of example, the chemical industry utilizes a crystal formation process wherein it is desirable to bring in a bulk material, separate out the crystals contained therein, and then wash the crystals. The mechanical separation device 100 as described herein may be used for such a process to achieve the results in a single device. Moreover, the juice industry similarly includes various processes wherein a bulk material is brought in and filtered. It may be desirable to wash the fruit or other bulk material as well. Again, the mechanical separation device 100 as described herein may be used in such applications. Moreover, other corn or grain milling processes may benefit from filtration disclosed herein. Additionally, other industries that seek to filter a material from a medium (e.g., liquid medium or otherwise) and/or wash the material may also benefit from the screening apparatus as described herein.

The mechanical separation device 100 described herein may also provide benefits to industries that utilize other types of filtration systems. For examples, some industries utilize decanter centrifuges and/or conic screen bowl centrifuges. Nevertheless, these centrifuges also have drawbacks which may be addressed by the mechanical separation device 100 disclosed herein. Typically, for example, decanter centrifuges have no washing zone and therefore separate devices must be used if washing the filtered material is desired. Of course these additional devices are costly and take up space within the manufacturing facility. Additionally, the mechanical separation device 100 described herein are able to provide a filtered material in a drier state as compared to the output of a decanter centrifuge. As noted above, providing a drier material may significantly reduce the energy costs associated with post processing of the material. Similarly, conic screen bowl centrifuges do not provide for washing of the filtered material.

The mechanical separation device 100 may include, but is not limited to the apparatus as shown in FIG. 1, such as a multi-zoned screening apparatus, a paddle screen, and the like. Typically, paddle screens are mechanical devices that separate components with a wedge wire. The screen designs, bar designs and bar handle in this application are improvements to the mechanical separation device to help separate the components in a more efficient manner, to improve throughput, to reduce capital costs and to reduce shutdown time at plants. These new designs in this application offer a variety of improvements along with reducing carbon footprint, as the plants implementing these new designs on mechanical separation devices will operate more efficiently, run smother, experience less stops and starts (downtime), and require less maintenance.

Figure 2:
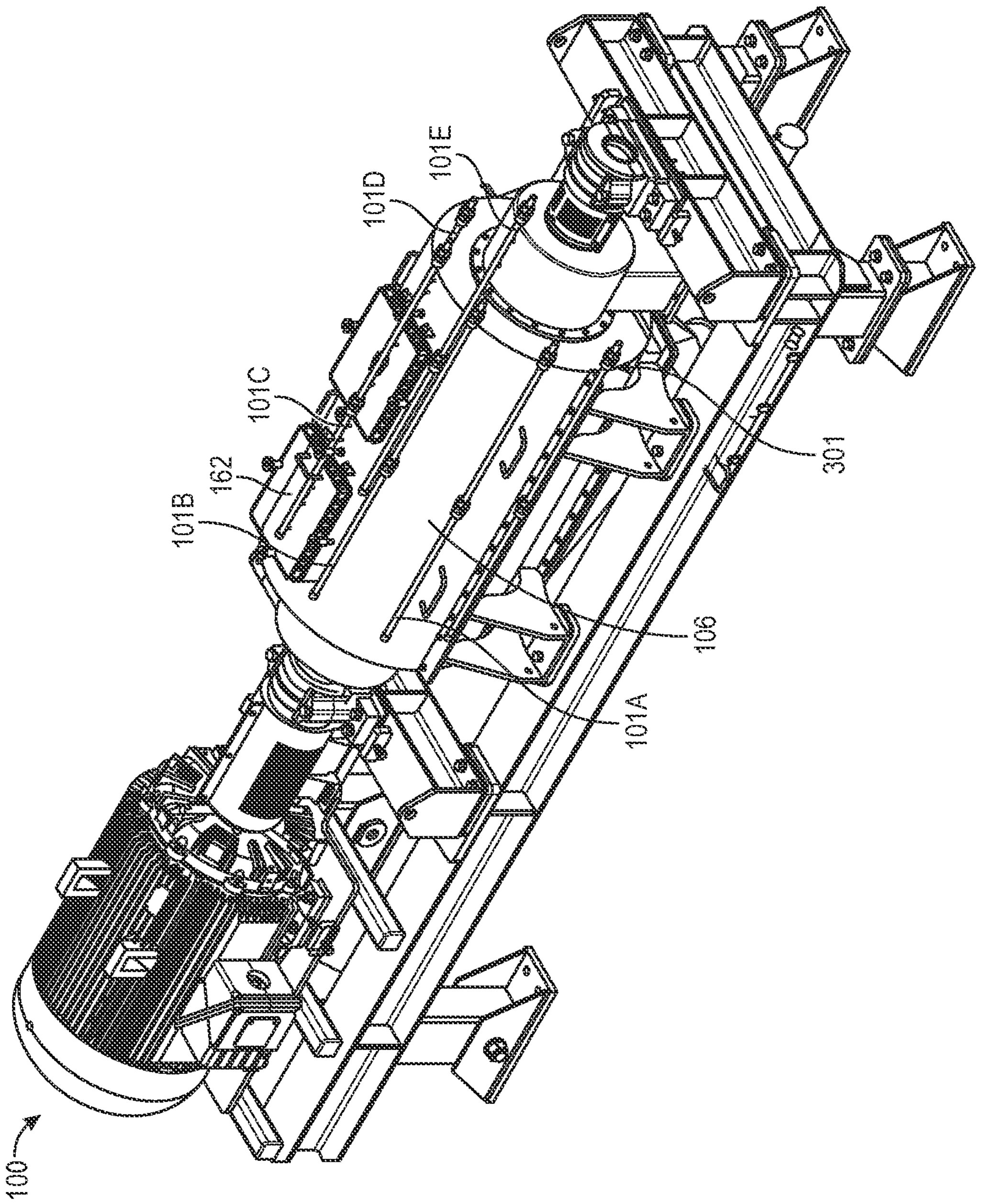
FIG. 2 is a perspective view of the example mechanical separation device of FIG. 1 illustrating a plurality of wash bars in phantom.

FIG. 2 shows a perspective view of the mechanical separation device 100 with a plurality of spray bars 101A, 101B, 101C, 101D, and 101E shown in phantom. These spray bars 101A, 101B, 101C, 101D, and 101E are positioned within the housing 106 as previously discussed. The spray bars 101A, 101B, 101C, 101D, and 101E include an inlet portion 301 protruding from an axial end of the housing 106. The inlet portion 301 can be configured to couple with one or more wash fluid lines (e.g., hoses, pipes, etc.) as further discussed herein. Hatches 162 or other port within housing 106 need not be opened to access the screens for cleaning.

Figure 2A:
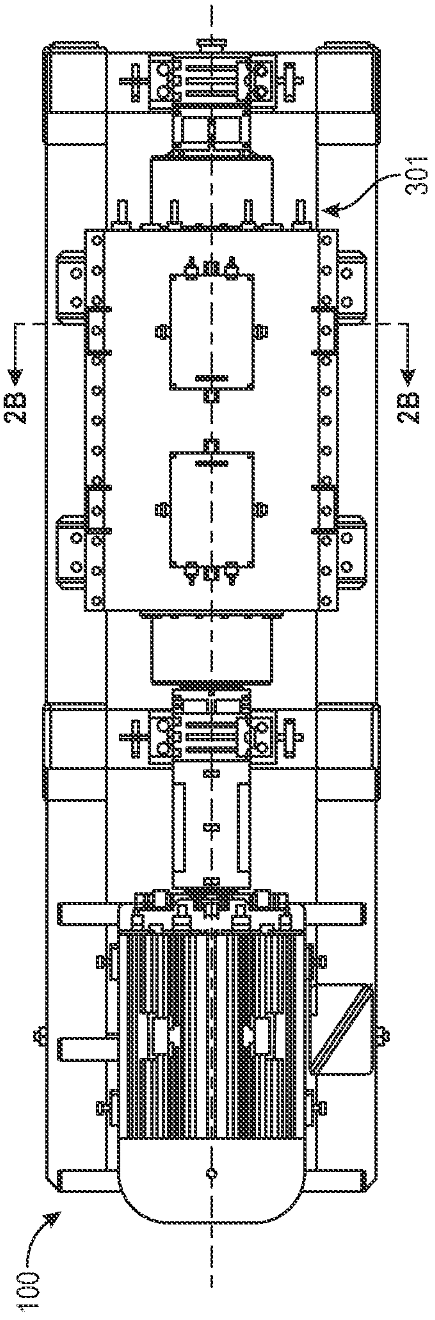
FIG. 2A is a top view of the mechanical separation device of FIGS. 1 and 2.
Figure 2B:
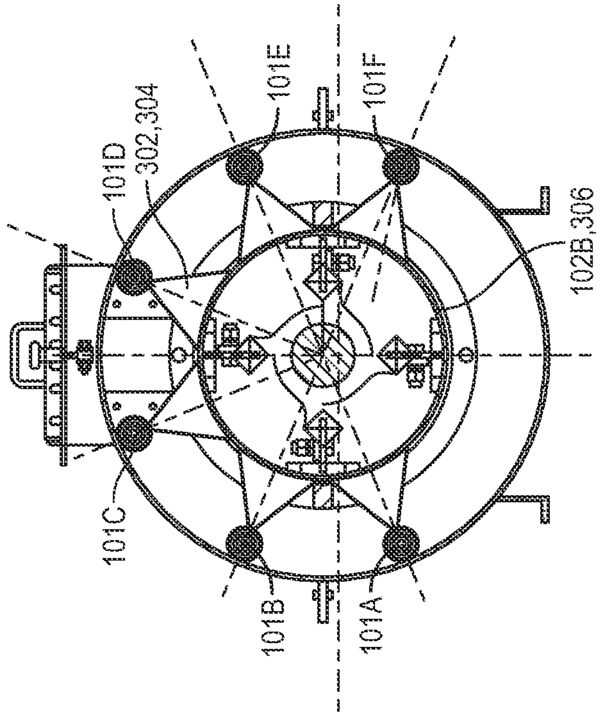
FIG. 2B is a cross-sectional view of the mechanical separation device of FIG. 2A showing the plurality of wash bars discharging a washing fluid onto a screen within a housing of the mechanical separation device.

FIG. 2A is a top view of the mechanical separation device 100 showing the inlet portion 301 protruding from the housing 106. FIG. 2B is a cross-section along line 2B-2B of FIG. 2A.

FIG. 2B shows a cross-section of the spray bars 101A, 101B, 101C, 101D, 101E and a further spray bar 101F. These spray bars are discharging wash fluid 302 onto the screen 102B. The discharge can have a conical shape 304 as shown in FIG. 2B. The discharge can cover between 15 degrees and 120 degrees of a circumference of the screen 102B. However, other shapes of discharge other than conical are also contemplated. The spray bars 101A, 101B, 101C, 101D, 101E and 101F can be spaced a few inches to a few feet from an exterior surface 306 of the screen 102B. The spray bars 101A, 101B, 101C, 101D, 101E and 101F can be arranged to extend around a portion of the circumference of the screen 102B as shown in FIG. 2B. In FIG. 2B, no spray bars are provided on an under side of the screen 102B as gravity can be sufficient to remove particulate and other materials on the screen 102B in this bottom (ground interfacing) portion. The spray bars 101A, 101B, 101C, 101D, 101E and 101F can be constructed of stainless steel or other metal material and can have a diameter of 0.125 inches to 1.5 inches. According to one embodiment the diameter of the spray bars 101A, 101B, 101C, 101D, 101E and 101F can be 0.5 inches. Geometrically, the spray bars 101A, 101B, 101C, 101D, 101E and 101F may be stagger different amounts from one another such that each spray bar 101A, 101B, 101C, 101D, 101E and 101F need not be at a same angle relative to one another.

Figure 3A:
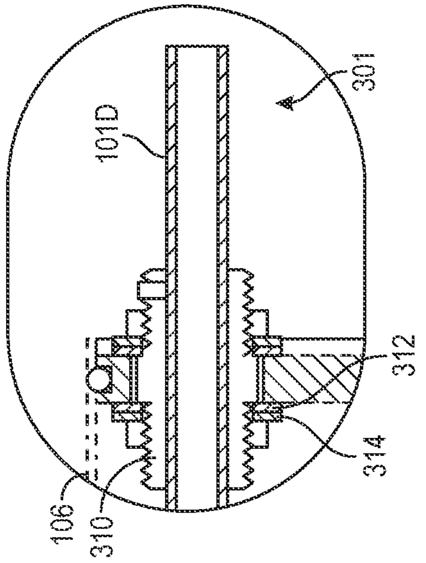
FIG. 3A is an enlarged view of an inlet section of one of the plurality of wash bars.
Figure 3:
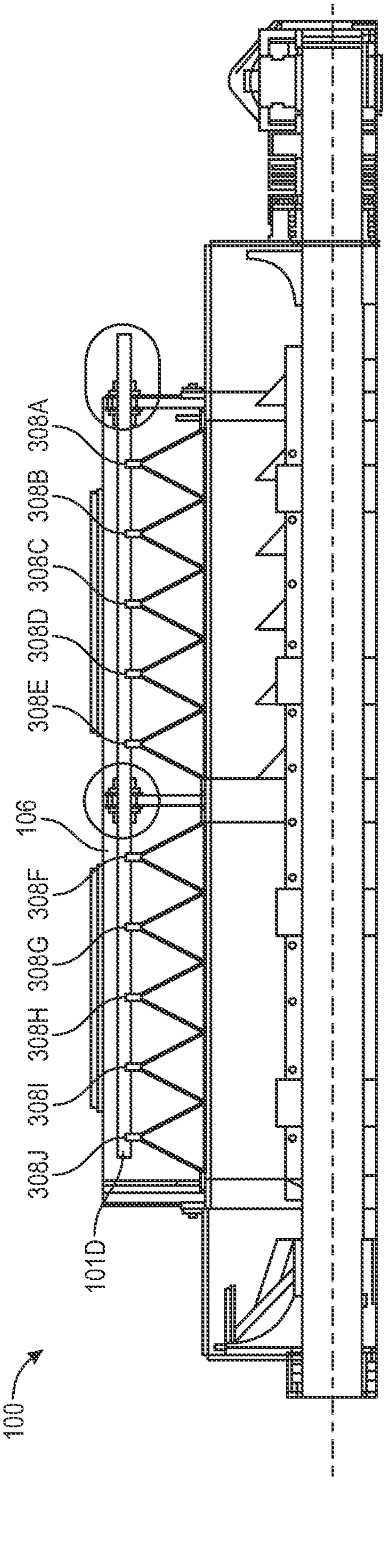
FIG. 3 is a cross-sectional view along an axial length of the example mechanical separation device of FIGS. 1-2A illustrating the plurality of wash bars with a plurality of nozzles discharging the washing fluid onto the screen.
Figure 7:
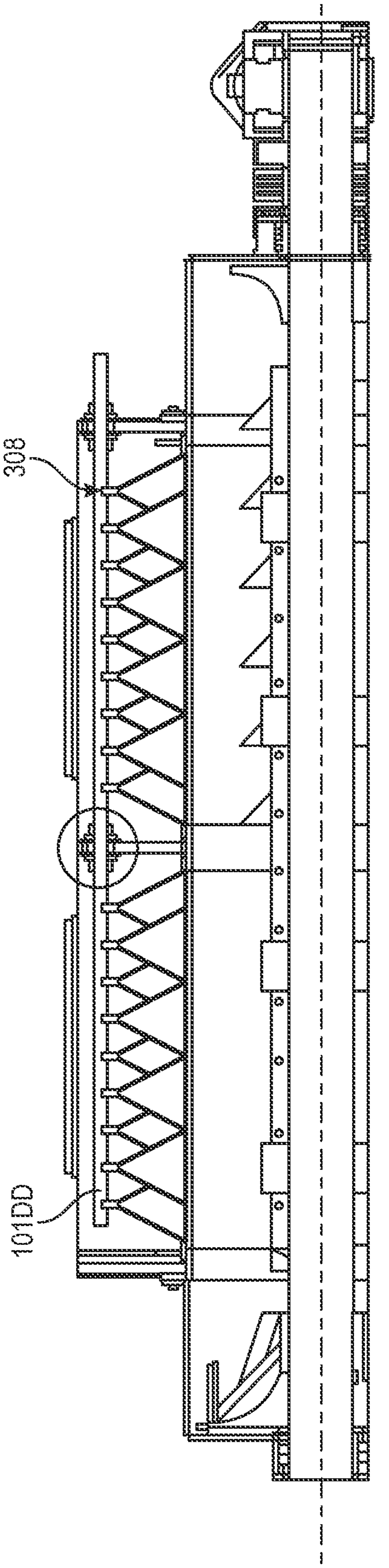
FIG. 7 is a cross-sectional view along an axial length of the mechanical separation device according to another embodiment.

FIG. 3 shows a cross-section of the mechanical separation device 100 along an axial length. The spray bar 101D is illustrated adjacent and spaced from the screens 102A and 102B. FIG. 3 further illustrates a plurality of nozzles 308A, 308B, 308C, 308D, 308E, 308F, 308G, 308H, 308I and 308J spaced along the axial length of the spray bar 101D. Spray bars 101A, 101B, 101C, 101E and 101F can have similar or staggered arrangement of nozzles. The nozzles 308A, 308B, 308C, 308D, 308E, 308F, 308G, 308H, 308I and 308J can have a spray angle of between 15 degrees and 120 degrees. According to some examples, the spray angle can be between 30 degrees and 90 degrees. According to some examples the spray angle can be substantially 60 degrees. The nozzles 308A, 308B, 308C, 308D, 308E, 308F, 308G, 308H, 308I and 308J can be 7/16 inch hex shaped with an orifice diameter of between 0.01 inches and 0.10 inches. The nozzles 308A, 308B, 308C, 308D, 308E, 308F, 308G, 308H, 308I and 308J can have a 1/8 inch NPT with 0.26 inch thread engagement such as nozzle part no. 32885K821 manufactured by McMaster-Carr® of Santa Fe Springs, CA Although ten nozzles 308A, 308B, 308C, 308D, 308E, 308F, 308G, 308H, 308I and 308J are shown in FIG. 3, it is contemplated that between four (4) and eighteen (18) nozzles can be utilized according to further embodiments. Each nozzle 308A, 308B, 308C, 308D, 308E, 308F, 308G, 308H, 308I and 308J can have a pressure of between 200 pounds/in$^2$ gauge and 500 pounds/in$^2$ gauge, inclusive. FIG. 7 shows an embodiment with a spray bar 101DD having eighteen (18) nozzles 308 that are not individually numbered for brevity.

FIG. 3A shows an enlargement of FIG. 3 and illustrates the inlet section 301 of the spray bar 101D in further detail including a portion that passes through the housing 106. This portion can couple with threaded bushing 310, one or more washer plates 312 and one or more gaskets 314. These components can support the spray bar 101D within the housing 106 and can seal the inlet section 301 such that fluid medium cannot escape. Inlet section 301 can include a bayonet, threaded or other connection to facilitate fluid communication coupling with wash fluid lines.

FIG. 4 shows an example of a portion of the screen 102A or 102B. The portion shown in FIG. 4 can be a semi-circular half of one of screen 102A or 102B. The screen 102A, 102B can be constructed of sheet metal with circular openings 400 according to one example. However, a mesh or other type screen as known in the art with openings 400 of a different geometry is also contemplated. The plurality of openings 400 in the screen 102A, 102B may vary in size depending on the specific application and on the type of material being filtered. For example, for filtration of fiber from a corn milling process, it is contemplated that the openings in the first screen 102A v. the second screen sections may differ. However, the openings 400 may be sized from about 10 microns (0.01 mm) to about 2000 microns (2 mm). In another example, the openings 400 may be from about 800 microns to about 1400 microns (about 0.8 mm to about 1.4 mm). The openings 400 in the first screen 102A may be the same size as the openings in second screen 102B. The size of the openings 400 will be determined based on size and shape of the desired material to be separated. The screens 102A, 102B can be provided with smaller openings due to the overall length. In certain applications, increasing the length of the screens 102A, 102B allows for smaller openings, which provides for a more desirable dewatering of the materials through the mechanical separation device 100. Smaller openings also can limit the amount of solids passing through the screens 102A, 102B while still providing for desirable recovery of liquid medium and output of dry material, e.g., fiber.

In yet other embodiments, the screen 102A, 102B may have different sizes for the plurality of openings 400. For example, the plurality of openings may range from smaller to larger sizes, such as sizes from about 1000 microns in a first section, about 1100 microns in a second section, and about 1200 microns in a third section. In another embodiment, the plurality of openings 400 may range from larger to smaller sizes, such as sizes from about 1200 microns in a first section, about 1100 microns in a second section, and about 1000 microns in a third section. In other embodiments, two sections may have similar plurality of opening sizes, while another section has a smaller or a larger plurality of opening size than the other two sections.

Figure 5:
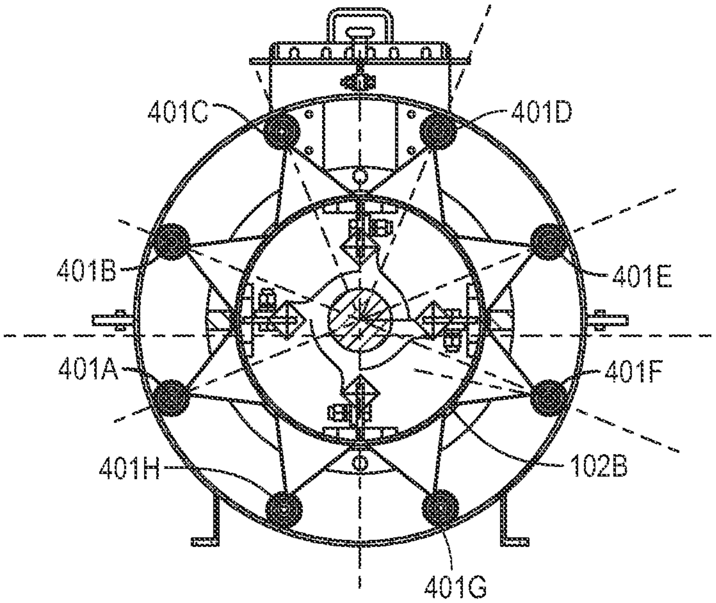
FIG. 5 is a cross-sectional view of the mechanical separation device according to another embodiment.
Figure 6:
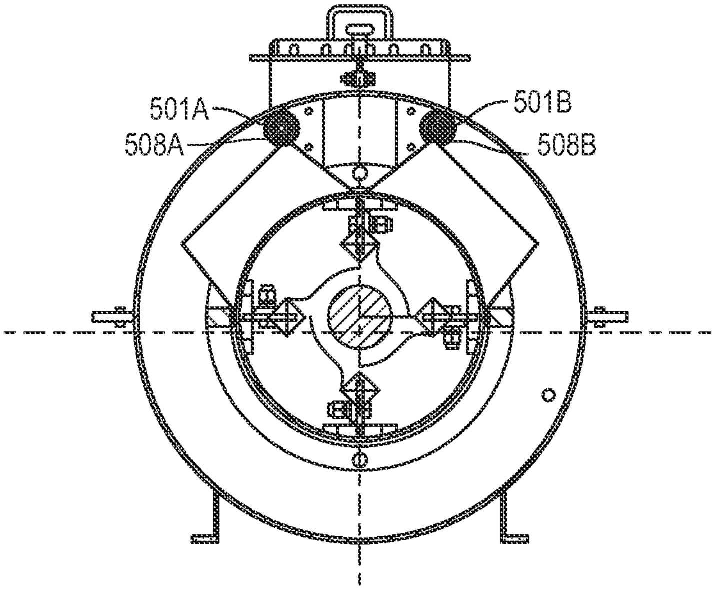
FIG. 6 is a cross-sectional view of the mechanical separation device according to yet another embodiment.

FIGS. 5 and 6 show alternative arrangements of spray bars. The FIG. 5 shows ten spray bars 401A, 401B, 401C, 401D, 401E, 401F, 401G and 401H arranged around substantially an entirety of the circumference of the screen 102B. This allows the discharge to initially contact substantially an entirety (substantially 360 degrees) of the screen 102B exterior surface. FIG. 6 shows two spray bars 501A and 501B with nozzles 508A and 508B, respectively having a wider angle of discharge (e.g., 120 degrees).

FIG. 8 shows a schematic diagram of a wash system 600 according to one example. The wash system 600 can harvesting or otherwise utilize repurposed wash fluid. Thus, the wash fluid can be from a flush water from a process within a production facility and/or can be a waste caustic from a process within the production facility. The system 600 can utilize pump discharge and can communicate this wash fluid through one or more wash fluid lines 602. The wash fluid can be provided at between 150 degrees and 180 degrees Fahrenheit, at a pressure of 10 to 50 pounds/in$^2$.

The system 600 can include various additional components including one or more check valves 604, one or more hand valves 606, one or more filters 608, one or more solenoid valves 610, one or more drain valves 612, an inlet stabilizer 614, one or more pumps 616, one or more safety valves 618, a regulator 620, a manual disconnect 622, one or more sensors 624 and spray bar valves 626A, 626B, 626C, 626AA, 626AAA, 626BB, 626BBB, 626CC and 626CCC. The system 600 can additionally include the spray bars 101A, 101B, 101C, 101D, 101E and 101F as previously illustrated and described.

The one or more wash fluid lines 602 can comprise pipe, hose or other fluid communicating components. In FIG. 8, the one or more wash fluid lines 602 can be 0.5 inches to 1.5 inches in diameter and can be constructed of 304SS or other steel or stainless steel.

The one or more filters 608 can utilize a 50 micron filter. The filters can be MicroSentry™ MB Series filters from Shelco Filters. The filter can be held in a cartridge filter housing such as RH Series from Shelco Filters. The one or more solenoid valves 610 can be XV and can electronically communicate with the electronic controller 154 or another controller. The electronic controller 154 can command the one or more solenoid valves 610 to close to regulate flow along the one or more wash fluid lines 602 to the inlet stabilizer 614, the one or more pumps 616 and other components.

The inlet stabilizer 614 can be manufactured by CAT Pumps® and can be stainless steel Model No. 714500 having a flow range of up to 45 gallons/minute with an active tube fitting of 2.5 inches. The one or more pumps 616 can be a piston pump manufactured by CAT Pumps® and can be stainless steel Model No. 6041 having a maximum flow of 40 gallons/minute with a pressure range of 100 to 1500 psi and bore of 1.811 inches. The pump 616 can have a flow rate of between 20 and 30 gallons per minute when operating and can have a discharge head pressure of between 300 and 400 psi. Estimated RPM would be 325 with a 10 HP motor. The one or more pumps 616 can be configured to provide the wash fluid to each of the plurality of nozzles at a discharge pressure of between 200 pounds/in$^2$ gauge and 500 pounds/in$^2$ gauge, inclusive. The one or more pumps can be configured to provide the wash fluid to each of the plurality of wash bars 101A, 101B, 101C, 101D, 101E and 101F at a flow rate of between 7.5 gallons/minute and 12.5 gallons/minute The one or more safety valves 618 can be manufactured by CAT Pumps® and can be stainless steel Model No. 890710 having a flow range of 0-100 gallons/minute, a system pressure range of 300-1500 psi and a maximum relief setting of 1875 psi. The pressure regulator 620 can be manufactured by CAT Pumps® and can be stainless steel Model No. 7375 having a flow range of 10-75 gallons/minute and a pressure range of 100-1000 psi. The one or more sensors 624 can be in electronic communication with the electronic controller 154 or another controller. The electronic controller 154 can monitor the one or more sensors 624 (here a pressure inductor transmitter PIT) and can adjust operation (pressure, volume, etc.) of the pump 616 accordingly. Although a PIT sensor is shown in FIG. 8, it is contemplated that the one or more sensors 624 could be flow or other type sensors according to further embodiments.

The manual disconnect 622 allows the regulator 620 to be bypassed in case it is desired that the one or more pumps 616 want to be operated at manual discretion. Thus, the manual disconnect 622 provides for a manual override configured to bypass the controller and actuate the one or more pumps of the system 600.

The controller 154 can be an electronic controller as known in the art. As discussed the controller 154 can electronically communicate with various components of the system 600 including the one or more solenoid valves 610, the one or more pumps 616, the one or more sensors 624, the one or more sensors 155 (FIG. 1) and spray bar valves 626A, 626B, 626C, 626AA, 626AAA, 626BB, 626BBB, 626CC and 626CCC.

The controller 154 using data from one or more of the sensors can determine a wash interval, wash duration, wash amount and other criteria for the screen(s). However, data from one or more sensors is not required in setting the wash interval, wash duration, wash amount and other criteria for the screen(s). The controller 154 may employ learning algorithms, user input and other feedback to set or alter these criteria. It is recognized these criteria may change with changes in the process or other operating conditions.

The controller 154 can include, for example, software, hardware, and combinations of hardware and software configured to execute several functions related to, among others, operation, washing and other features for the mechanical separation device 100. The controller 154 can be an analog, digital, or combination analog and digital controller including a number of components. As examples, the controller 154 can include integrated circuit boards or ICB(s), printed circuit boards PCB(s), processor(s), data storage devices, switches, relays, or any other components. Examples of processors can include any one or more of a microprocessor, a controller, a digital signal processor (DSP), an application specific integrated circuit (ASIC), a field-programmable gate array (FPGA), or equivalent discrete or integrated logic circuitry. Commercially available microprocessors can be configured to perform the functions of the controller 154. Various known circuits may be associated with controller 154, including power supply circuitry, signal-conditioning circuitry, actuator driver circuitry (i.e., circuitry powering solenoids, motors, or piezo actuators), and communication circuitry. In some examples, the controller 154 may be positioned on the device 100, while in other examples the controller 154 may be positioned at an off-board location (remote location) relative to the mechanical separation device 100.

The controller 154 can include a memory such as memory circuitry. The memory may include storage media to store and/or retrieve data or other information such as, for example, input data from the one or more sensors. Storage devices, in some examples can be a computer-readable storage medium. The data storage devices can be used to store program instructions for execution by processor(s) of the controller 154, for example. The storage devices, for example, are used by software, applications, algorithms, as examples, running on and/or executed by the controller 154. The storage devices can include short-term and/or long-term memory and can be volatile and/or non-volatile. Examples of non-volatile storage elements include magnetic hard discs, optical discs, floppy discs, flash memories, or forms of electrically programmable memories (EPROM) or electrically erasable and programmable (EEPROM) memories. Examples of volatile memories include random access memories (RAM), dynamic random-access memories (DRAM), static random-access memories (SRAM), and other forms of volatile memories known in the art.

Although shown in reference to the controller 154, aspects of the system 600 can be implements on one or more remote servers or other such computing devices using a control interface. In some examples, the controller 154 and various components of the system 600 can be connected to one another and/or otherwise in communication via a network. The network may be a local area network ("LAN"), a larger network such as a wide area network ("WAN"), or a collection of networks, such as the Internet. Protocols for network communication, such as TCP/IP, may be used to implement the network, Although examples are described herein as using a network such as the Internet, other distribution techniques may be implemented that transmit information.

As shown in FIG. 8 the one or more wash fluid lines 602 can have the spray bar valves 626A, 626B, 626C, 626AA, 626AAA, 626BB, 626BBB, 626CC and 626CCC there along to regulate flow of the wash fluid generated by the one or more pumps 616. The one or more wash fluid lines 602 can separate into distinct parallel lines adjacent the mechanical separation device 100.

The valves 626A, 626B, 626C, 626AA, 626AAA, 626BB, 626BBB, 626CC and 626CCC can be controlled by the controller 154 to regulate flow of the wash fluid to the mechanical separation device 100 as desired. According to one example, the controller 154 can be configured to control operation of at least the one or more pumps 616 to pump the wash fluid through the one or more wash fluid lines 602 to one or more of the plurality of wash bars 101A, 101B, 101C, 101D, 101E and 101F (and hence to the plurality of nozzles). The controller 154 controls a duration of the discharge of the wash fluid to be between 10 seconds and 10 minutes, inclusive. The controller 154 controls an interval between the discharge of the wash fluid and a subsequent discharge of the wash fluid from a same nozzle to occur between 1 time/hour and 1 time/day, inclusive. The controller 154 controls the one or more valves 626A, 626B, 626C, 626AA, 626AAA, 626BB, 626BBB, 626CC and 626CCC regulating the flow through the one or more wash fluid lines 602 to stagger the flow of the wash fluid to the plurality of wash bars 101A, 101B, 101C, 101D, 101E and 101F such that only one or two of the plurality of wash bars 101A, 101B, 101C, 101D, 101E and 101F receives the flow of the wash fluid at a time.

Example Environment

Figure 9:
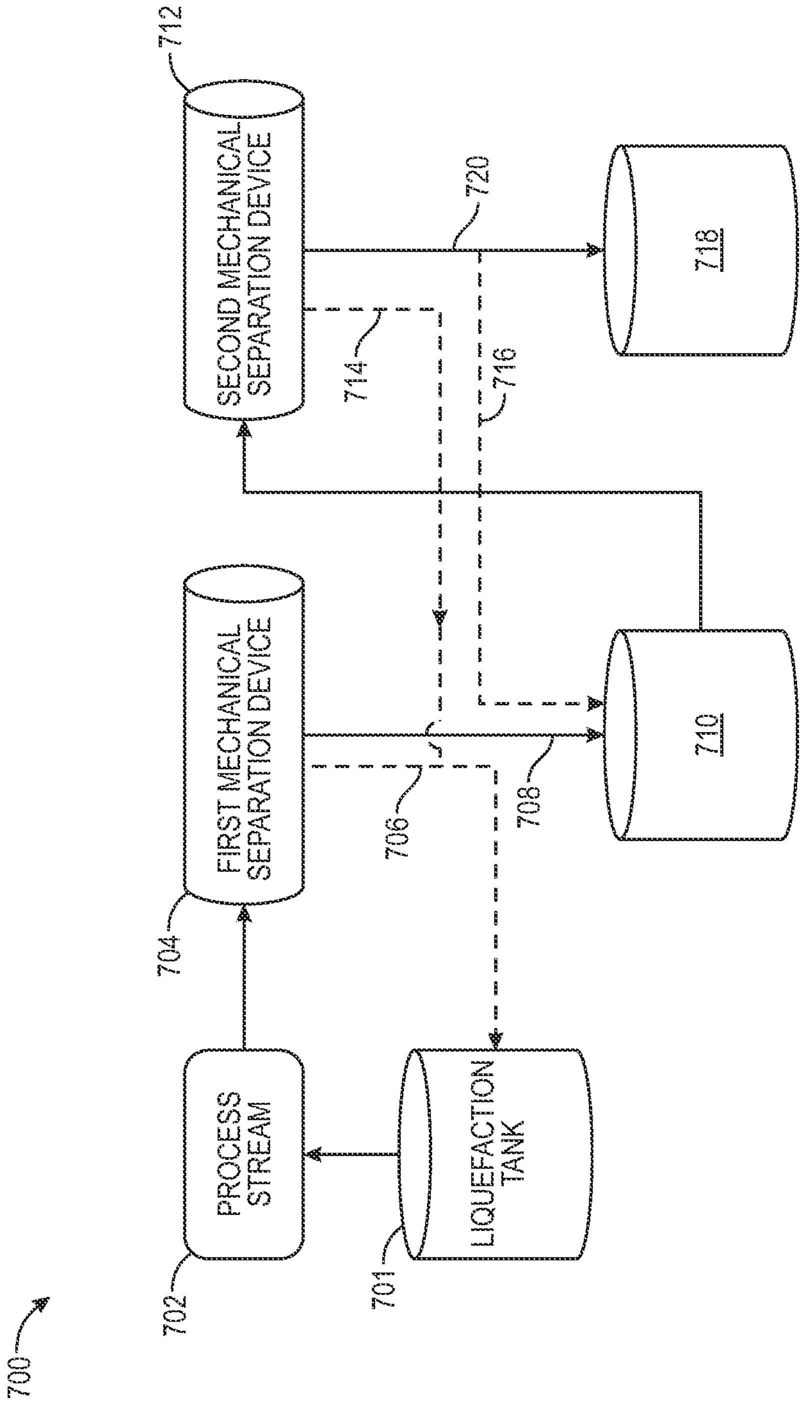
FIG. 9 is a flow diagram of an example process in which the example mechanical separation device or system of FIGS. 1-8 can be used.

FIG. 9 illustrates an example of an environment of a process 700 that may use a mechanical separation device 100 as described above with respect to FIGS. 1-8. The process 700 illustrates an example using a counter-flow wash process. For illustrative purposes, the liquids are identified by dotted lines to indicate being sent to a tank. These examples illustrate streams that may be sent from the mechanical separation devices and streams received into the tanks from the different mechanical separation devices. However, the liquids stream may be sent to water make up process, a receiving tank, a slurry tank, a liquefaction tank, a remix tank, and the like, while any streams may be received into the tanks from any of the mechanical separation devices. The terms, such as large-particles, larger-size particles, and solids are used to describe the materials separated by the mechanical separation devices. These tend to be considered of solids content and includes larger size particles than the liquids with small particles, which are liquids content and include smaller size particles than the solids, which will be referred to as liquids stream.

The process 700 receives a process stream 702, which may be a slurry from a slurry tank prior to being cooked or from a liquefaction tank 701. The process 700 separates the components, and may further washes the material. The process 700 sends the process stream 702 through a first mechanical separation device 704, which can be similar or identical to the example mechanical separation device 100 described above or can be a different mechanical separation device entirely. The first mechanical separation device 704 separates components such as larger solid particles from the smaller particles and liquid medium a first time. This is also referred to as a first pass. The first tank 710 may contain about 40% solids content (average).

The process 700 produces a liquids stream 706 and a solids stream 708. The liquids stream 706 may include starch that has been separated from the fiber by the first mechanical separation device 704. However, the solids stream 708 may still contain starch and/or the food grade protein. Thus, the process 700 may wash the fiber through a series of mechanical separation devices.

The process 700 directs the liquids stream 706 to a liquefaction tank 701 and sends the solids stream 708 to a first tank 710. The first tank 710 receives another liquids stream 720 of clean water. Here, the combined streams are mixed and heated to about 76° C. to about 85° C. (170° F. to about 185° F., about 349 K to about 358 K) for about 1 to about 60 minutes. In an embodiment, the combined streams are mixed and heated to about 82° C. (about 180° F., about 355 K) for about 5 minutes. The process 700 sends this combined stream from the first tank 710 to a second mechanical separation device 712, which can be similar or identical to the mechanical separation device 100 described above or can be a different mechanical separation device entirely.

The second mechanical separation device 712 separates fiber from the liquid medium, which includes additional starch that has been washed from the fiber, producing another liquids stream 714 to be sent to a water makeup process, which makes the process stream 702 (as shown by the dotted line), or alternatively, to liquefaction tank, to makeup water for slurry tank. The second mechanical separation device also provides another solids stream 716 that is sent to the second tank 718. The process 700 sends the combined stream from the first tank 710 through the second mechanical separation device 712, which separates components such as the solid particles from the smaller particles and liquids stream a second time, also referred to as a second pass. The second tank 718 may contain about 40% solids content (average).

Those of ordinary skill in the art will recognize how to modify or configure the mechanical separation device 100 so as to effectively operate in these other industries. Thus, the various features of the invention may be used alone or in numerous combinations depending on the needs and preferences of the user.

Claim Related Examples

In Example 1, a mechanical separation device optionally includes one or more of a housing, a screen a rotary assembly, one or more wash bars and a plurality of nozzles. The housing can have a feed inlet at a first end section of the housing and a discharge outlet at a second end section of the housing. The feed inlet can be configured to receive a slurry comprising solids within a liquid medium. The screen can be positioned within the housing to separate at least a portion of the liquid medium from the solids. The rotary assembly can be within the housing and can be configured to move the solids and the liquid medium along an axial length of the housing toward the discharge outlet. The one or more wash bars can be within the housing and can be positioned adjacent the screen. The plurality of nozzles can be spaced along the one or more wash bars. The one or more wash bars can be configured to receive a wash fluid and the plurality of nozzles configured to discharge the wash fluid against the screen.

Example 2 is the mechanical separation device of Example 1, further optionally including a controller configured to control a flow of the wash fluid to the one or more wash bars and the plurality of nozzles.

Example 3 is the mechanical separation device of Example 2, optionally the controller controls a duration of the discharge of the wash fluid and an interval between the discharge and a second discharge.

Example 4 is the mechanical separation device of any one or any combination of Examples 1-3, optionally the one or more wash bars comprise between two and eight wash bars, inclusive, and wherein the one or more wash bars are arranged in a spaced relationship around an exterior of the screen.

Example 5 is the mechanical separation device of any one or any combination of Examples 1-4, optionally the screen has a hollow cylindrical shape with a plurality of apertures therein, and wherein the one or more wash bars are arranged adjacent an exterior surface of the screen with the one or more wash bars surrounding at least a portion of a circumference to substantially an entirety of the circumference of the screen.

Example 6 is the mechanical separation device of any one or any combination of Examples 1-5, optionally each of the plurality of nozzles has a spray angle relative to the screen to provide between 15 degrees and 120 degrees, inclusive, of coverage of the wash fluid along the circumference of the screen.

Example 7 is the mechanical separation device of any one or any combination of Examples 1-6, optionally the plurality of nozzles comprises between four and eighteen nozzles.

Example 8 is the mechanical separation device of any one or any combination of Examples 1-7, optionally the one or more wash bars has an inlet section that extends through the housing, wherein the inlet section is configured to be coupled with a wash fluid line.

Example 9 is the mechanical separation device of any one or any combination of Examples 1-8, optionally one or more of the plurality of nozzles has an orifice with a diameter of between 0.025 inches and 0.10 inches, and wherein the orifice is configured to provide for a conical shape for the discharge of the wash fluid.

Example 10 is the mechanical separation device of any one or any combination of Examples 1-9, optionally the rotary assembly comprises: a shaft having a longitudinal axis; a plurality of paddles coupled to the shaft, at least one of the plurality of paddles having an outer edge and aligned radially relative to the longitudinal axis, wherein the at least one of the plurality of paddles has an elongate extent along the longitudinal axis with opposing lateral sides along the elongate extent; and a plurality of flingers coupled to the at least one of the plurality of paddles at the outer edge, each of the plurality of flingers extending from the paddle to be positioned radially and tangentially outward of both opposing lateral sides of the at least one paddle.

Example 11 is an automated washing system that optionally includes any one or combination of one or more pumps, one or more wash fluid lines in fluid communication with the one or more pumps, one or more valves configured to regulate a flow of a wash fluid through the one or more wash fluid lines, a mechanical separation device and a controller. The mechanical separation device can optionally include a housing, a screen, a rotary assembly, a plurality of wash bars, and a plurality of nozzles. The housing can have a feed inlet at a first end section of the housing and a discharge outlet at a second end section of the housing, the feed inlet configured to receive a slurry comprising solids within a liquid medium. The screen can be positioned within the housing to separate at least a portion of the liquid medium from the solids. The rotary assembly can be within the housing, the rotary assembly configured to move the solids and the liquid medium along an axial length of the housing toward the discharge outlet. The plurality of wash bars can be within the housing and positioned adjacent the screen. The plurality of nozzles can be spaced along each of the plurality of wash bars, wherein each of the plurality of nozzles is configured to discharge the wash fluid against the screen. The controller can be configured to control operation of at least the one or more pumps to pump the wash fluid through the one or more wash fluid lines to one or more of the plurality of wash bars and to the plurality of nozzles.

Example 12 is the system of Example 11, optionally the controller controls a duration of the discharge of the wash fluid to be between 10 seconds and 10 minutes, inclusive.

Example 13 is the system of any one or combination of Examples 11-12, optionally the controller controls an interval between the discharge of the wash fluid and a subsequent discharge of the wash fluid from a same nozzle to occur between 1 time/hour and 1 time/day, inclusive.

Example 14 is the system of any one or combination of Examples 11-13, optionally the controller controls the one or more valves regulating the flow through the one or more wash fluid lines to stagger the flow of the wash fluid to the plurality of wash bars such that only one or two of the plurality of wash bars receives the flow of the wash fluid at a time.

Example 15 is the system of any one or combination of Examples 11-14, optionally the one or more pumps are configured to provide the wash fluid to each of the plurality of nozzles at a discharge pressure of between 200 pounds/in$^2$ gauge and 500 pounds/in$^2$ gauge, inclusive.

Example 16 is the system of any one or combination of Examples 11-15, optionally the one or more pumps are configured to provide the wash fluid to each of the plurality of wash bars at a flow rate of between 7.5 gallons/minute and 12.5 gallons/minute.

Example 17 is the system of any one or combination of Examples 11-16, optionally comprising a manual override configured to bypass the controller and actuate the one or more pumps.

Example 18 is the system of any one or combination of Examples 11-17, optionally the wash fluid comprises at least one of a flush water from a process within a production facility and a waste water from the process within the production facility.

Example 19 is the system of any one or combination of Examples 11-18, optionally, further comprising: one or more sensors configured to sense an amount of the solids in the slurry at the discharge outlet; wherein the controller is in communication with the one or more sensors and the controller is configured to implement operation of the one or more pumps to pump the wash fluid to wash the screen based upon the amount of the solids in the slurry at the discharge outlet sensed by the one or more sensor.

Example 20 is a method of washing a screen within a housing of a mechanical separation device including any one or any combination of controlling with an electronic controller pumping of a wash fluid to one or more wash bars within the housing and positioned adjacent the screen; and discharging the wash fluid against the screen from a plurality of nozzles spaced along the one or more wash bars.

Example 21 is the method of Example 20, optionally further comprising controlling with the electronic controller one or more of: a duration of the discharge of the wash fluid; an interval between the discharge of the wash fluid and a subsequent discharge of the wash fluid from a same nozzle; and which of the one or more wash bars receives a flow of the wash such that only one or two of the plurality of wash bars receives the flow of the wash fluid at a time.

Example 22 is the method of any one or combination of Examples 20-21, optionally further comprising providing the wash fluid to each of the plurality of wash bars at a pressure of between 200 pounds/in$^2$ gauge and 500 pounds/in$^2$ gauge, inclusive.

Example 23 is the method of any one or combination of Examples 20-22, optionally further comprising providing the wash fluid to each of the plurality of wash bars at a flow rate of between 7.5 gallons/minute and 12.5 gallons/minute.

Example 24 is the method of any one or combination of Examples 20-23, optionally further comprising harvesting the wash fluid from a flush water from a process within a production facility and a waste water from the process within the production facility.

Example 25 is the method of any one or combination of Examples 20-24, optionally further comprising manually overriding the controller to actuate the pumping.

Example 26 is the method of any one or combination of Examples 20-25, optionally further comprising: sensing an amount of solids in a slurry comprising the solids within a liquid medium; and controlling with the electronic controller pumping of the wash fluid to one or more wash bars within the housing and positioned adjacent the screen based upon the sensing of the amount of the solids.

What is claimed is:

1. An automated washing system comprising:

one or more pumps;

a plurality of wash fluid lines in fluid communication with the one or more pumps;

a plurality of valves each of the plurality of valves configured to regulate a flow of a wash fluid through a corresponding one of the plurality of wash fluid lines;

a mechanical separation device comprising:

a housing with a feed inlet at a first end section of the housing and a discharge outlet at a second end section of the housing, the feed inlet configured to receive a slurry comprising solids within a liquid medium, a screen positioned within the housing to separate at least a portion of the liquid medium from the solids, a rotary assembly within the housing, the rotary assembly configured to move the solids and the liquid medium along an axial length of the housing toward the discharge outlet, a plurality of wash bars within the housing and positioned adjacent the screen, wherein each of the plurality of wash bars is coupled to a corresponding one of the plurality of wash fluid lines, wherein the plurality of wash bars comprise between four and eight wash bars, inclusive, and wherein the plurality of wash bars are arranged in a spaced relationship around an exterior of the screen, and a plurality of nozzles spaced along each of the plurality of wash bars, wherein each of the plurality of nozzles is configured to discharge the wash fluid against the screen; and a controller configured to control operation of at least the one or more pumps to pump the wash fluid through the plurality of wash fluid lines to the plurality of wash bars and to the plurality of nozzles, wherein the controller controls the plurality of valves regulating the flow through the plurality of wash fluid lines to stagger the flow of the wash fluid to the plurality of wash bars such that only one or two of the plurality of wash bars receives the flow of the wash fluid at a time, wherein the controller controls a duration of discharge of the wash fluid and an interval between a first discharge and a second discharge of the wash fluid.

2. The system of claim 1, wherein the controller controls a duration of discharge of the wash fluid to be between 10 seconds and 10 minutes, inclusive.

3. The system of claim 1, wherein the one or more pumps are configured to provide the wash fluid to each of the plurality of wash bars at a flow rate of between 7.5 gallons/minute and 12.5 gallons/minute.

4. The system of claim 1, further comprising a manual override configured to bypass the controller and actuate the one or more pumps.

5. The system of claim 1, wherein the wash fluid comprises at least one of a flush water from a process within a production facility and a waste water from the process within the production facility.

6. The system of claim 1, further comprising:

one or more sensors configured to sense an amount of the solids in the slurry at the discharge outlet;

wherein the controller is in communication with the one or more sensors and the controller is configured to implement operation of the one or more pumps to pump the wash fluid to wash the screen based upon the amount of the solids in the slurry at the discharge outlet sensed by the one or more sensors.

7. The system of claim 1, wherein the plurality of nozzles comprises between four and eighteen nozzles.

8. The system of claim 1, wherein the plurality of wash bars each has an inlet section that extends through the housing, wherein the inlet section is configured to be coupled with one of the plurality of wash fluid lines.

9. The system of claim 1, wherein each of the plurality of nozzles has an orifice with a diameter of between 0.025 inches and 0.10 inches, and wherein the orifice is configured to provide for a conical shape for discharge of the wash fluid.

10. The system of claim 1, wherein the screen has a hollow cylindrical shape with a plurality of apertures therein, and wherein the plurality of wash bars are arranged adjacent an exterior surface of the screen with the plurality of wash bars surrounding at least a portion of a circumference to substantially an entirety of the circumference of the screen.

11. The system of claim 1, wherein each of the plurality of nozzles has a spray angle relative to the screen to provide between 15 degrees and 120 degrees, inclusive, of coverage of the wash fluid along a circumference of the screen.

12. The system of claim 1, wherein the rotary assembly comprises:

a shaft having a longitudinal axis;

a plurality of paddles coupled to the shaft, at least one of the plurality of paddles having an outer edge and aligned radially relative to the longitudinal axis, wherein the at least one of the plurality of paddles has an elongate extent along the longitudinal axis with opposing lateral sides along the elongate extent, and a plurality of flingers coupled to the at least one of the plurality of paddles at the outer edge, each of the plurality of flingers extending from the at least one of the plurality of paddles to be positioned radially and tangentially outward of both opposing lateral sides of the at least one of the plurality of paddles.

13. An automated washing system comprising:

one or more pumps;

a plurality of wash fluid lines in fluid communication with the one or more pumps;

a plurality of valves each of the plurality of valves configured to regulate a flow of a wash fluid through a corresponding one of the plurality of wash fluid lines;

a mechanical separation device comprising:

a housing with a feed inlet at a first end section of the housing and a discharge outlet at a second end section of the housing, the feed inlet configured to receive a slurry comprising solids within a liquid medium, a screen positioned within the housing to separate at least a portion of the liquid medium from the solids, a rotary assembly within the housing, the rotary assembly configured to move the solids and the liquid medium along an axial length of the housing toward the discharge outlet, a plurality of wash bars within the housing and positioned adjacent the screen, wherein each of the plurality of wash bars is coupled to a corresponding one of the plurality of wash fluid lines, wherein the plurality of wash bars comprise between four and eight wash bars, inclusive, and wherein the plurality of wash bars are arranged in a spaced relationship around an exterior of the screen, and a plurality of nozzles spaced along each of the plurality of wash bars, wherein each of the plurality of nozzles is configured to discharge the wash fluid against the screen; and a controller configured to control operation of at least the one or more pumps to pump the wash fluid through the plurality of wash fluid lines to the plurality of wash bars and to the plurality of nozzles, wherein the controller controls the plurality of valves regulating the flow through the plurality of wash fluid lines to stagger the flow of the wash fluid to the plurality of wash bars such that only one or two of the plurality of wash bars receives the flow of the wash fluid at a time, wherein the controller controls an interval between discharge of the wash fluid and a subsequent discharge of the wash fluid from a same nozzle to occur between 1 time/hour and 1 time/day, inclusive.

14. An automated washing system comprising:

one or more pumps, a plurality of wash fluid lines in fluid communication with the one or more pumps;

a plurality of valves each of the plurality of valves configured to regulate a flow of a wash fluid through a corresponding one of the plurality of wash fluid lines;

a mechanical separation device comprising:

a housing with a feed inlet at a first end section of the housing and a discharge outlet at a second end section of the housing, the feed inlet configured to receive a slurry comprising solids within a liquid medium, a screen positioned within the housing to separate at least a portion of the liquid medium from the solids, a rotary assembly within the housing, the rotary assembly configured to move the solids and the liquid medium along an axial length of the housing toward the discharge outlet, a plurality of wash bars within the housing and positioned adjacent the screen, wherein each of the plurality of wash bars is coupled to a corresponding one of the plurality of wash fluid lines, wherein the plurality of wash bars comprise between four and eight wash bars, inclusive, and wherein the plurality of wash bars are arranged in a spaced relationship around an exterior of the screen, and a plurality of nozzles spaced along each of the plurality of wash bars, wherein each of the plurality of nozzles is configured to discharge the wash fluid against the screen; and a controller configured to control operation of at least the one or more pumps to pump the wash fluid through the plurality of wash fluid lines to the plurality of wash bars and to the plurality of nozzles, wherein the controller controls the plurality of valves regulating the flow through the plurality of wash fluid lines to stagger the flow of the wash fluid to the plurality of wash bars such that only one or two of the plurality of wash bars receives the flow of the wash fluid at a time, wherein the one or more pumps are configured to provide the wash fluid to each of the plurality of nozzles at a discharge pressure of between 200 pounds/in$^2$ gauge and 500 pounds/in$^2$ gauge, inclusive.

* * * * *